US008878670B2

(12) United States Patent
Rosen et al.

(10) Patent No.: US 8,878,670 B2
(45) Date of Patent: Nov. 4, 2014

(54) METHOD AND APPARATUS FOR IMPROVING THE BATTERY LIFE OF A TRACKER ATTACHED TO AN ASSET WHILE OUTSIDE A BASE SAFE-ZONE

(75) Inventors: Eric C. Rosen, Solana Beach, CA (US); Douglas M. Crockett, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 13/602,253

(22) Filed: Sep. 3, 2012

(65) Prior Publication Data

US 2014/0062695 A1  Mar. 6, 2014

(51) Int. Cl.
| | |
|---|---|
| G08B 21/00 | (2006.01) |
| G08B 21/18 | (2006.01) |
| G01V 15/00 | (2006.01) |
| G08B 21/02 | (2006.01) |
| G08B 13/14 | (2006.01) |

(52) U.S. Cl.
CPC ............... *G08B 21/18* (2013.01); *G01V 15/00* (2013.01); *G08B 21/0219* (2013.01); *G08B 21/023* (2013.01); *G08B 13/1427* (2013.01); *G08B 21/0255* (2013.01); *G08B 21/0277* (2013.01); *G08B 21/0283* (2013.01); *G08B 21/0288* (2013.01)
USPC ................ 340/539.13; 340/539.3; 340/572.1; 235/375

(58) Field of Classification Search
CPC . G01S 5/205; G08B 13/2462; G08B 13/1427
USPC ................... 340/10.1, 539.1, 539.11, 539.13, 340/539.21, 539.3, 572.1, 572.4; 235/375
See application file for complete search history.

(56) References Cited

U.S. PATENT DOCUMENTS

| | | |
|---|---|---|
| 7,259,671 B2 | 8/2007 | Ganley et al. |
| 7,411,492 B2 | 8/2008 | Greenberg |

(Continued)

FOREIGN PATENT DOCUMENTS

| | | |
|---|---|---|
| EP | 1699183 A1 | 9/2006 |
| WO | WO-2008076668 A1 | 6/2008 |

OTHER PUBLICATIONS

International Search Report and Written Opinion—PCT/US2013/057857—ISA/EPO—Jan. 2, 2014.

(Continued)

*Primary Examiner* — Jeffery Hofsass
(74) *Attorney, Agent, or Firm* — James T. Hagler

(57) ABSTRACT

Methods, devices, and systems for saving battery service life by preventing false alarms when a tracked asset is intentionally removed from a base safe-zone. A portable safe-zone beacon may create a portable safe-zone by broadcasting signals similar to a transmitter within a base safe-zone. A tracking device may employ a relatively low-power short-range radio transceiver to receive safe-zone broadcasts. If the tracking device does not detect safe-zone broadcasts before a timing counter expires, the tracking device may activate a high-power, long-range transceiver and transmit an alarm message via a wireless network. The tracking device may distinguish between transmissions of the portable safe-zone beacon and a transmitter of the base safe-zone and may operate differently based on being within different safe-zones. In response to receiving broadcasts, the tracking device may transmit response messages to the portable safe-zone beacon. In an embodiment, devices may relay data to and from the tracking device.

41 Claims, 11 Drawing Sheets

(56) References Cited

U.S. PATENT DOCUMENTS

| | | |
|---|---|---|
| 7,639,131 B2 | 12/2009 | Mock et al. |
| 7,705,728 B2 | 4/2010 | Mock et al. |
| 7,973,657 B2 | 7/2011 | Ayed |
| 2008/0143604 A1* | 6/2008 | Mock et al. .................. 342/450 |
| 2008/0316022 A1 | 12/2008 | Buck et al. |

OTHER PUBLICATIONS

Cooper, "ZOMM Wireless Leash Plus speaks up for abandoned iPhones" posted Dec. 8, 2011, retrieved from http://www.engadget.com/2011/12/08/zomm-wireless-leash-plus-speaks-up-for-abandoned-iphones-video/ on May 7, 2012.

* cited by examiner

METHOD AND APPARATUS FOR IMPROVING THE BATTERY LIFE OF A TRACKER ATTACHED TO AN ASSET WHILE OUTSIDE A BASE SAFE-ZONE

FIELD OF THE INVENTION

The present invention relates generally to computer network communications, and more specifically to methods and devices for tracking assets.

BACKGROUND

Asset tracking systems are often designed to monitor whether an asset is within a prescribed geo-spatial area, which is often referred to as being defined by a geofence. Asset tracking systems may employ tracking devices that are applied to tracked assets and transmit an alarm message including the assets' locations when they leave the geofence. As an example, the asset may be a pet or a piece of construction equipment, and the geofence may encompass the pet's yard or the equipment's construction site.

In a type of asset tracking systems, the devices may monitor wireless beacon signal with a signal strength configured such that the signal will be received within a signal strength threshold encompassing the geofence. The beacon signal defines a "safe zone" such that so long as the tracking device can receive the beacon signal is received within the threshold the tracker device is within the geofence, and therefore can remain in a low-power mode. Tracking devices of this design may remain in a power-savings mode so long as they stay within the base safe-zone.

When a tracking device leaves the safe-zone defined by the beacon signals, which may be referred to as a "breach" of the geofence, the tracking device no longer receives the short-range wireless transmissions of the beacon within the predefined threshold strength, which cause the tracking device to enter a high power mode for obtaining a location (e.g., a GPS fix) and transmitting alarm messages via a high-power transceiver (e.g., cellular transceiver). For example, the tracking device on a dog may transmit an alarm message as a SMS message to the dog owner. However, if the asset and corresponding tracking device is removed from the safe-zone by the owner (e.g., the dog goes on a walk with the owner), the tracking device may transmit false alarm messages and unnecessarily consumer significant amounts of battery power by activating the high-power transceiver.

SUMMARY

The various embodiments provide convenient solutions for reducing the power consumption of tracking devices by suppressing the transmission of false alarm messages when the tracking device is removed by an owner from the safe-zone range of the beacon transmitter (referred to herein as the "base safe-zone"). The asset may be equipped with a tracking device including a short-range radio transceiver for receiving/transmitting safe-zone wireless transmissions and a long-range (or high power) transceiver for transmitting alarm messages. The system may include a portable safe-zone beacon that can be carried by a user (e.g., pet owner or authorized equipment handler/employee), which includes at least a short-range radio transmitter. The portable safe-zone beacon short-range radio transmitter may be configured to broadcast short-range radio transmissions (i.e., portable safe-zone broadcasts) that, in effect, define a portable safe-zone and enable the removal of the tracking device from the base safe-zone without causing it to enter an alarm mode and begin transmitting alarm messages. While receiving short-range radio broadcasts from either the base safe-zone or the portable safe-zone, the tracking device may remain in a low-power state (i.e., not sending alarm messages) and therefore conserve power.

In an embodiment, the tracking device may operate differently based on the whether it receives portable safe-zone broadcasts or base safe-zone broadcasts. For example, based on detecting location within a portable safe-zone, the tracking device may configure time delay variables to allow for longer time periods following loss of the portable safe-zone broadcasts before transmitting alarm messages. In another embodiment, the portable safe-zone beacon may include a second short-range radio transceiver, such as a Bluetooth® radio, with which the portable safe-zone beacon may communicate with various additional mobile devices. For example, the user may pair a smartphone with the portable safe-zone beacon via a Bluetooth® data link. With communications to connected mobile devices, the portable safe-zone beacon may relay collected data to and from the tracking device. For example, the portable safe-zone beacon may transmit firmware software updates from a remote server to the tracking device.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
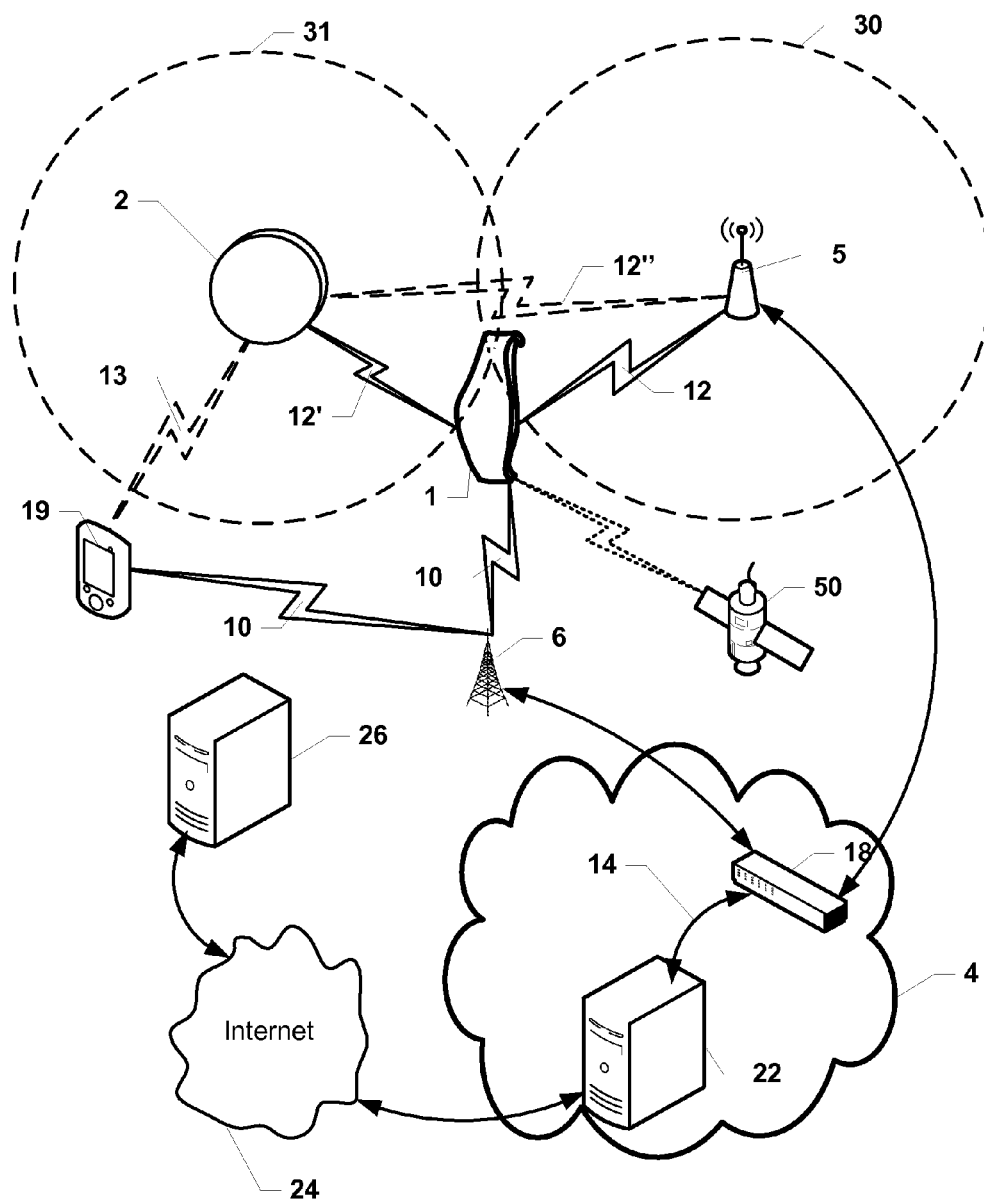
FIG. 1 is a communication system block diagram of a communication network that includes a tracking device linked to local wireless communication networks according to an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the term "mobile device" refers to any one or all of cellular telephones, smartphones, personal data assistants (PDA's), palm-top computers, wireless electronic mail receivers, and cellular telephone receivers (e.g., the Blackberry® and Treo® devices), multimedia Internet enabled cellular telephones (e.g., the Blackberry Storm®), and similar personal electronic devices that include a programmable processor and memory, a wireless communication transceiver.

In various embodiments, a tracking system may include a tracking device for monitoring the location, as well as other conditions (e.g., physical activity), of an asset, such as a dog or a piece of equipment. The tracking device may be worn by or otherwise connect to the asset (e.g., a collar, an affixed medallion, etc.). The tracking device may include both a low-power short-range radio transceiver and a relatively high-power transceiver or radio, such as a cellular telephone transceiver. The tracking system may also include at least one base safe-zone beacon transmitter that broadcasts a low-power, and thus short-range radio transmissions that define a "base safe-zone." While within the base safe-zone, the tracking device may receive the relatively short-range radio transmissions (or base safe-zone broadcasts) and in response remain in a low power state with the high-power radio turned off, thereby maintaining a low-power consumption rate.

When the tracking device is removed from the base safe-zone, and thus out of range of receiving the base safe-zone broadcasts, the tracking device may enter an alarm mode, which is a high-power state, to determine its location and transmit alarm messages via its high-power radio. For example, if the asset is taken out of the base safe-zone for a time exceeding a predefined counter, the tracking device may activate its high-power radio (or wireless transceiver) and transmit an alarm message via a cellular data network. In embodiments in which some of the functionality is implemented in a server, the server may issue or send the alarm in response to a signal received from the tracking device. The alarm message may be an e-mail or SMS message directed to one or more people notifying them of the asset's failure to return to the base safe-zone within the predefined alarm counter period. Alarm messages may include various descriptive information, such as the identity of the asset/tracking device, urgency indicators (e.g., the alarm is a high/medium/low urgency), information describing previously received transmissions, the location of the tracking device (e.g., GPS coordinates), and sensor data indicating biometric information of the asset (e.g., temperature sensor showing body temperature, accelerometer data showing anatomical activity, etc.). An example of methods, systems and devices for tracking devices in base safe-zone systems is described in U.S. patent application Ser. No. 13/472,300 entitled "Reduction Of False Alarms In Asset Tracking", the entire contents of which are hereby incorporated by reference.

The various embodiments enable the creation of tracking systems further including a portable safe-zone beacon that establishes a portable safe-zone for suppressing tracking device alarm messages. The portable safe-zone beacon may be a small unit including at least a short-range radio transceiver that a user may put in his/her pocket. For example, the portable safe-zone beacon may be attached to the user's keychain. While away from a base safe-zone (or base safe-zone area), the tracking device may receive via short-range radio transceiver wireless transmissions (or portable safe-zone broadcasts) from the portable safe-zone beacon. Such portable safe-zone broadcasts may be lower power than the base safe-zone broadcasts so that the effective safe-zone around the user is smaller than the base geofence (e.g., 10 to 30 meters). The tracking device may determine that it is within a safe-zone based on receiving the portable safe-zone broadcasts. For example, if a pet owner carrying the portable safe-zone beacon walks his dog equipped with a tracking device away from the yard the tracking device will not enter the high-power mode and issue an alarm unless the dog runs away (e.g., further than 30 meters away) from the owner. This enables the tracking device to be used outside the base safe-zone without generating a false alarm or running down the battery.

The tracking device may transmit alarm messages when not within either the portable safe-zone or the base safe-zone (i.e., a breach or breach event). For example, if during a walk away from the base safe-zone, a dog runs away from his owner who is carrying the portable safe-zone beacon, the tracking device may lose reception of the portable safe-zone broadcasts emitted by the portable safe-zone beacon and, in response, enter the high-power mode to transmit alarm messages. In an embodiment, the tracking device may utilize a portable alarm counter that indicates the amount of time during which the tracking device may receive a safe-zone broadcast before transmitting an alarm message. If the portable alarm counter expires, the tracking device may activate the long-range transceiver and transmit an alarm message. In addition to the portable alarm counter, the tracking device may use a base alarm counter for determining when the tracking device may transmit an alarm message due to being outside of the base safe-zone.

In an embodiment, the portable safe-zone broadcasts transmitted by the portable safe-zone beacon may emulate the base safe-zone broadcasts but be different in a manner that enables the tracking device to recognize when it is receiving portable safe-zone broadcasts. This recognition of portable safe-zone broadcasts enables the tracking device to implement different settings or functionality while outside of the base safe-zone. For example, the portable safe-zone broadcasts may use the same frequency and data structures as base safe-zone broadcasts, but include different identifying data to indicate that the signals are transmitted by the portable safe-zone beacon. In an embodiment, the portable safe-zone beacon may be configured to automatically begin emulating the base safe-zone broadcast by processing such broadcasts while located within the base safe zone and self-configuring the transmitter to transmit similar signals (e.g., in frequency, message content, repetition rate, etc.). Alternatively, the portable safe-zone beacon may be configured based on default information stored in the portable safe-zone beacon, data received from transmissions by the tracking device, and/or through communications with computing devices connected via other wired or wireless data links (e.g., via a Bluetooth® link with a smartphone). In an embodiment, portable safe-zone broadcasts may transmit software instructions configured for execution by the tracking device.

In an embodiment, the tracking device may identify when received short-range broadcasts originate from the portable safe-zone beacon or the base safe-zone beacon based on detected message characteristics. For example, message headers within received transmissions may include information identifying particular safe-zones and/or transmitting devices, such as the portable safe-zone beacon or base safe-zone beacon.

Based on the characteristics of received broadcasts, the tracking device may determine whether it is within the base safe-zone or a portable safe-zone, and configure operations (or a low-power mode) for that type of safe-zone. For example, the time to wait after the safe-zone beacon is lost before transmitting alarm messages (e.g., alarm counter) may be configured to be shorter or longer when the tracking device is within the portable safe-zone than when it is within the base safe-zone. As another example, while within the portable safe-zone, the tracking device may transmit enhanced data to the portable safe-zone beacon at an increased frequency via its short-range radio and/or increase the frequency of sampling (or polling) of sensors (e.g., accelerometers) within the tracking device, such as to better record the level of activity during a walk.

In an embodiment, the portable safe-zone beacon may include a second short-range radio transceiver, such as a Bluetooth®, Zigbee®, Peanut®, or ANT/ANT+, with which the portable safe-zone beacon may communicate with other wireless devices, such as the user's smartphone. For example, the portable safe-zone beacon may pair its Bluetooth® transceiver with that of the user's smartphone so that the two devices can communicate with one another. Through the second short-range transceiver, the portable safe-zone beacon may relay tracking device data to the user's smartphone, which may relay data via a long range wireless data network, such as a cellular telephone network, to/from remote server. Since the user's smartphone has a large battery that is routinely charged, the smartphone can be used as a communication link for the tracking device via the low-power radio link between the portable safe-zone beacon and the tracking device. This communication relay facilitated by the portable safe-zone beacon enables the tracking device communicate with a server on an external network without draining its battery at the rate that would otherwise occur if the tracking device used its high-power transceiver to communicate directly with the server.

In an embodiment, the tracking device may utilize a protocol file that defines logic rules and/or software instruction sets for execution on the tracking device's processor. The protocol file may define conditions, such as system variable values, and actions for the tracking device to perform based on the type of safe-zone beacon it is receiving. The tracking device may generate, format, and transmit messages based on information within the protocol file. In other words, the protocol file may instruct the tracking device when to generate a message containing particular information and to transmit that message to specified recipients. For example, the protocol file may direct the tracking device to immediately send email and SMS text message alarm messages when the base alarm counter expires. As another example, the protocol file may instruct the tracking device to generate and transmit a short-range radio message to the portable safe-zone beacon that contains data describing the tracking device's current battery status. The tracking device may also collect data from sensors, such as accelerometers and gyroscopes, based on instructions within the protocol file. For example, the protocol file may instruct the tracking device to poll accelerometer sensors with a certain regularity if within a portable safe-zone.

The protocol file may indicate different instructions (e.g., addresses to which alarm messages should be sent, etc.) based on a low-power mode of the tracking device. The low-power mode may depend upon the safe-zone in which the tracking device is located, which may be determined from the last received safe-zone broadcast. For example, the tracking device may configure the low-power mode to indicate the base-safe zone (i.e., base low-power mode) when the tracking device receives base safe-zone broadcasts and to indicate the portable safe-zone when receiving portable safe-zone broadcasts (i.e., portable low-power mode). With different low-power mode settings, the protocol file may direct the tracking device to utilize different alarm counters when determining when to transmit alarm messages upon loss of a safe-zone beacon signal. For example, the protocol file may indicate that the tracking device should transmit an alarm message in response to determining that a certain number of seconds have passed without the tracking device receiving safe-zone broadcasts while configured to operate in base low-power mode. The protocol file may also instruct different manners of alarm message transmissions based on the low-power mode. For example, if an alarm counter expires while in a base low-power mode (e.g., the base alarm counter expires), the protocol file may indicate that an alarm message should be sent to the asset owner's home phone. Alternatively, if a counter expiration (or breach event) occurs while in a portable low-power mode (e.g., the portable alarm counter expires), the protocol file may instruct the tracking device to transmit alarm messages to the asset owner and emergency services, such as municipal animal services, the police, etc.

Additionally, the protocol file may dictate a schedule or periodicity for sending messages. For example, the protocol file may indicate that the tracking device should send alarm messages every few minutes until either the tracking device battery is depleted or a base safe-zone broadcast is received. As another example, to abate false alarms, the protocol file may direct the tracking device to wait a predetermined amount of time after an alarm counter expires before transmitting any alarm message. In an embodiment, the tracking device may update or otherwise modify the protocol file based on data and/or instructions within safe-zone broadcasts, transmissions with the portable safe-zone beacon, or any other communications received via the tracking device's various transceivers.

In the various embodiments, the characteristics and contents of alarm messages transmitted after the tracking device loses a base or portable safe-zone broadcast (i.e., a breach event) may be defined by the protocol file and may be based on the low-power mode setting at the time of the breach event. For example, the protocol file in combination with the last safe-zone signal being received from a base safe-zone beacon may define that the alarm message should be an SMS message containing the identity of the tracking device. As another example, the protocol file in combination with the last safe-zone signal being received from a portable safe-zone beacon may define that an email that includes sensor data in addition to the tracking device identity be sent to particular email addresses. In an embodiment, the contents of alarm messages may vary based on other variables, such as the time of the breach event, a distance from the base safe-zone, and sensor measurements at the time of the breach even.

FIG. 1 illustrates an embodiment communication network for a tracking device 1 to receive safe-zone broadcasts and transmit messages to various devices. The tracking device 1 may be placed on an asset, such as a pet, equipment, vehicles, or other property. For example, a pet owner may place an embodiment tracking device 1 on his/her dog as a collar. As another example, the tracking device 1 may be placed on a bulldozer at a construction site. The tracking device 1 may exchange wireless communications with a base safe-zone beacon 5 and/or a portable safe-zone beacon 2 via wireless links 12, 12', 12". The wireless communications via wireless links 12, 12', 12" may be short-range radio transmissions (e.g., base safe-zone broadcasts, portable safe-zone broadcasts, etc.), and may utilize radio protocols, such as Bluetooth®, Bluetooth® LE, RF, etc.

The wireless link 12 range about which the base safe-zone beacon 5 may transmit short-range radio transmissions (i.e., base safe-zone broadcasts) may define the perimeter of a base safe-zone 30. If the tracking device 1 is within the range of base safe-zone broadcasts, the tracking device 1 may be considered within the base safe-zone 30. An exemplary base safe-zone 30 may be the backyard of a pet owner's house. As another example, a base safe-zone 30 may be a warehouse, store, or any other enclosed area in which an asset is to be stored and/or tracked. Similarly, the range in which the tracking device 1 may receive portable safe-zone broadcasts from the portable safe-zone beacon 2 may be considered the portable safe-zone 31. In other words, if the tracking device 1 is within range of receiving wireless transmissions via the wireless links 12, 12', the tracking device 1 may be within at least one safe-zone 30, 31.

In an embodiment, the portable safe-zone beacon 2 may exchange short-range radio transmissions with the base safe-zone beacon 5 via optional wireless link 12". For example, while within the base safe-zone 30, the portable safe-zone beacon 2 may receive base safe-zone broadcasts from the base safe-zone beacon 5. As described above, the portable safe-zone beacon may configure portable safe-zone broadcasts based on information within received base safe-zone broadcasts.

The tracking device 1 may also include a long-range radio or wireless transceiver capable of exchanging data with a cellular tower 6 via a long-range data link 10. For example, the tracking device 1 may be equipped with a cellular network modem and an antenna capable of transmitting data transmissions to a 3G, 4G or LTE cellular network. As described below, as the long-range (or high-power) radio data link 10 may receive increased power consumption, the tracking device 1 may selectively use the long-range radio. For example, when receiving safe-zone broadcasts via short-range wireless links 12, 12', the tracking device 1 may deactivate, turn off, or configuring the long-range radio to "sleep". In various embodiments, the tracking device 1 may utilize the long-range radio data link 10 to transmit alarm messages (e.g., when outside of safe-zones 30, 31). In an embodiment, the tracking device 1 may also include a global positioning system (GPS) chip and exchange location data with a GPS satellite 50.

Using the long-range data link 10 or the short-range wireless link 12, the tracking device 1 may exchange data with the cellular tower 6 or the base safe-zone beacon 5, respectively, and establish communications with a data network 4. For example, the tracking device 1 may transmit data through the cellular tower 6 to a cellular telephone system. The data network 4 may include switching centers 18 that are coupled in network connections 14 to Internet gateway servers 22 to enable data connections to the Internet 24. The data network 4 may also enable telephone calls to be made to cellular telephones 19 as well as landline telephones (not shown). Through the Internet 24, messages may be sent to remote servers 26 configured to provide asset monitoring services, such as alarm message handling and other tracking device 1 data processing.

In an embodiment, the portable safe-zone beacon 2 may optionally include a second wireless transceiver, such as a Bluetooth®, Zigbee®, or Peanut® radio. Using the second wireless transceiver, the portable safe-zone beacon 2 may exchange data with a mobile device 19 (e.g., a smartphone, tablet, etc.) via a wireless link 13. Prior to exchanging transmissions via the wireless link 13, the portable safe-zone beacon 2 and mobile device 19 may perform pairing (and coupling/bonding) operations that provide exclusive or authenticated transmissions between the devices 2, 19. For example, the portable safe-zone beacon 2 may execute a Bluetooth pairing operation to become a bonded or trusted communications partner with the mobile device 19. In an embodiment, the mobile device 19 may relay data from the portable safe-zone beacon 2 to the data network 4 (and vice versa) via the long-range data link 10 with the cellular tower 6. In doing so, the portable safe-zone beacon 2 may exchange data with the various devices connected to the data network 4 and/or the Internet 24, such as the remote server 26.

In an embodiment, assets carrying (or connected to) the tracking device 1 may be larger than the range of the short-range radio transmissions from the base safe-zone beacon 5 and/or portable safe-zone beacon 2. For example, the asset may be a yacht with a length exceeding short-range transmission ranges. In this case, safe-zones 30, 31 may exceed the areas within short-range radio transmissions range from the base safe-zone beacon 5 and/or portable safe-zone beacon 2. For example, the safe-zones 30, 31 may be defined by a geo-fence or virtual fence (as may be determined by a GPS receiver or cellular telephone tower IDs). That is, virtual fences may be programmed by use of GPS coordinates to set the boundaries of the safe-zones 30, 31. In an alternative embodiment, a base safe-zone 30 may include more than one base safe-zone beacon 5 spaced apart so as to provide broadcast coverage of the entire base safe-zone 30.

Figure 2A:
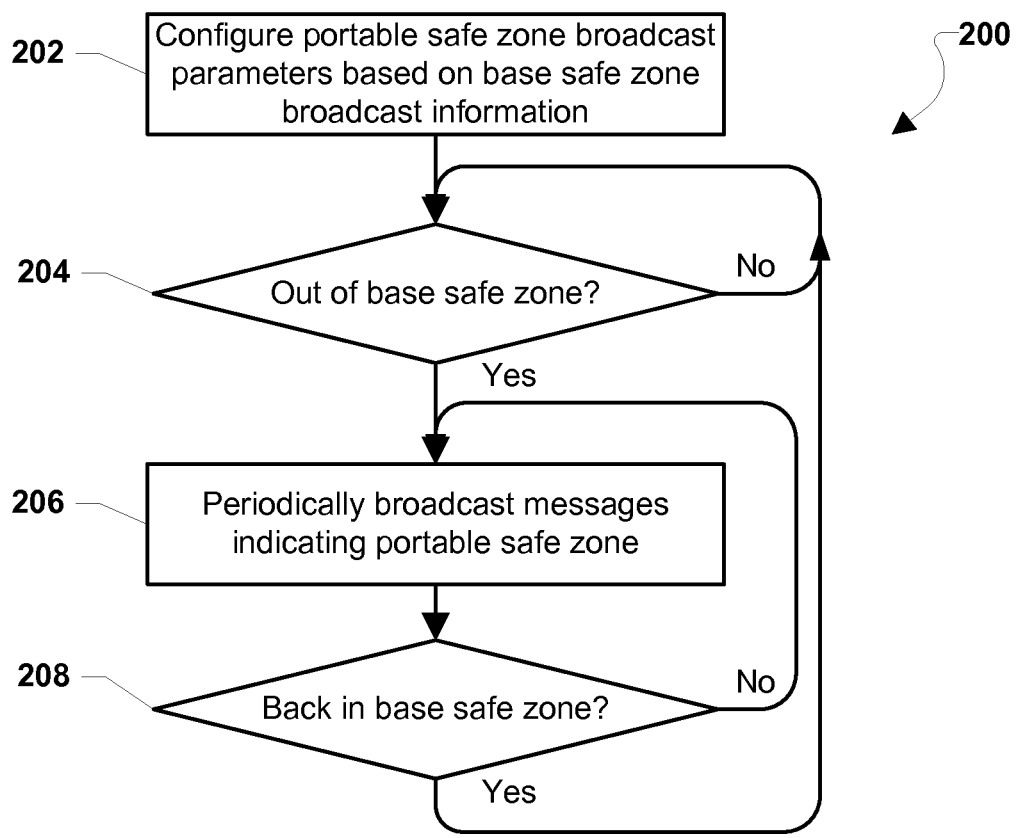
FIG. 2A is a process flow diagram illustrating an embodiment method for a portable safe-zone beacon broadcasting transmissions indicating a portable safe-zone to a tracking device.

FIG. 2A illustrates an embodiment method 200 for a portable safe-zone beacon to broadcast transmissions that indicate a portable safe-zone to a tracking device associated with an asset. If an asset owner intends to remove the asset from a base safe-zone, the owner may not desire to have the tracking device transmit an alarm message. For example, a dog owner may want to walk his dog down a street away from his/her backyard (i.e., the base safe-zone). In such a scenario, the owner may carry the portable safe-zone beacon and remove the asset from the base safe-zone without triggering an alarm message. The portable safe-zone beacon may create a portable safe-zone by transmitting portable safe-zone broadcasts similar to the base safe-zone broadcasts that the tracking device may receive and process to suppress alarm message transmissions. As described above with reference to FIG. 1, the portable safe-zone may be the area around the portable safe-zone beacon in which the tracking device may be in range of and receive portable safe-zone broadcasts from the portable safe-zone beacon. While within the portable safe-zone (as while within the base safe-zone), the tracking device may not activate the long-range radio transceiver.

In block 202, the portable safe-zone beacon may configure the parameters of the portable safe-zone broadcasts that define the portable safe-zone. As described above, the portable safe-zone broadcasts may be short-range radio transmissions capable of being received by the tracking device's short-range transceiver. Portable safe-zone broadcasts may be the same as (or emulated) base safe-zone broadcasts. For example, portable safe-zone broadcasts may contain the same data and formatting as base safe-zone broadcasts. Alternatively, portable safe-zone broadcasts may contain data and instructions for the tracking device that are different or non-existent within base safe-zone broadcasts. For example, portable safe-zone broadcasts may include timestamp information and base safe-zone broadcasts may not. In an embodiment, the portable safe-zone beacon portable safe-zone broadcasts may include additional information identifying the broadcasts as copied or emulated (e.g., an emulated flag) from base safe-zone broadcasts. For example, the emulated broadcasts may contain a bit or embedded code indicating message contents that were copied from a base safe-zone beacon's safe-zone broadcast.

Portable safe-zone broadcasts may be configured based on information within base safe-zone broadcasts received via the portable safe-zone beacon's short-range radio. For example, while within the short-range radio range of the base safe-zone beacon (i.e., while within the base safe-zone), the portable safe-zone beacon may receive base safe-zone broadcasts in a manner similar to the tracking device. The portable safe-zone beacon may receive and parse base safe-zone broadcasts, determining various information from metadata (or header) information within the transmissions. Alternatively, the portable safe-zone beacon may store a received base safe-zone broadcast and copy the exact information for subsequent transmissions as portable safe-zone broadcasts when outside of the base safe-zone.

From received base safe-zone broadcasts, the portable safe-zone beacon may determine identification and/or configuration information about the base safe-zone and its various associated devices. Base safe-zone broadcasts may describe the base safe-zone beacon, the tracking device, nearby local area network routers, as well as identification information about the asset owner. For example, base safe-zone broadcasts may contain unique indicators of the base safe-zone beacon's identity (e.g., serial number of the base safe-zone beacon device). The base safe-zone broadcasts may also contain authentication information (e.g., passwords, secret codes, etc.) required by the base safe-zone beacon and/or tracking device to authenticate communications. For example, the tracking device may require all valid safe-zone broadcasts to include special codes, or alternatively, to specially-format data, to ensure the broadcasts originate from registered devices, thereby preventing spoofing attempts and theft of the tracking device. In an embodiment, safe zone broadcasts may be encrypted by the base safe-zone beacon or the portable safe-zone beacon.

In an embodiment, the portable safe-zone beacon may also determine other, more detailed information from the base safe-zone beacon broadcasts that the portable safe-zone beacon may use to configure the portable safe-zone. For example, the portable safe-zone beacon may identify information within received base safe-zone broadcasts, such as timestamp information (e.g., the time of broadcast), default alarm counter values associated with the base safe-zone (e.g., an indicator of the amount of time a recipient tracking device may wait before sending an alarm message), and other data that may provide direction to the tracking device. For example, a base safe-zone broadcast transmission may contain contact information for the asset owner (e.g., contact cell phone number, email address, street address, etc.) that the tracking device may use to transmit subsequent alarm communications via the long-range radio. The base safe-zone beacon may also transmit location information describing the spatial extent of the base safe-zone (e.g., base safe-zone geo-fence perimeter coordinates), which the portable safe-zone beacon may use to configure an effective range for a portable safe-zone perimeter. For example, based on determined base safe-zone geo-fence perimeter information, the portable safe-zone may be set to encompass a smaller, similar, or differently-shaped portable safe zone by the portable safe-zone beacon.

In another embodiment, the portable safe-zone beacon may configure portable safe-zone broadcasts based on data received via wireless transmissions from other devices associated with the base safe-zone. In particular, the portable safe-zone beacon may include another short-range radio transceiver, such as a Bluetooth radio, with which the portable safe-zone beacon may communicate with a mobile device, such as a smartphone, carried by the asset owner. As described below, the portable safe-zone beacon may first pair (or securely connect and authenticate) with the mobile device before exchanging data. The mobile phone may execute software (or an "app") that is associated with the base safe-zone beacon and/or the base safe-zone. For example, the app on the mobile phone may store configurations for the base safe-zone beacon broadcasts (e.g., frequency of broadcast transmissions, scheduling of broadcasts throughout a time period, alarm counter information, alarm time tolerance thresholds, identification data regarding tracking devices associated with the base safe-zone, etc.). Once a communication link is established with the mobile device, the portable safe-zone beacon may receive and store the various configuration data describing the base safe-zone, utilizing the data to define or configure the portable safe-zone broadcasts. In an embodiment, through the mobile app, the mobile device may receive user input data and transmit configuration information to the portable safe-zone beacon for implementation in the portable safe-zone broadcasts. For example, the user may adjust the default frequency of portable safe-zone broadcasts based interactions with the mobile device app. In another embodiment, the mobile device may also pair and communicate with the base safe-zone beacon and similarly transmit configuration data for the base safe-zone.

Returning to FIG. 2, in determination block 204, the portable safe-zone beacon may determine whether it has been removed from the base safe-zone. If the portable safe-zone beacon does not receive base safe-zone broadcasts within a predetermined time period, the portable safe-zone beacon may determine that it is outside of the base safe-zone. In an embodiment, the portable safe-zone beacon may employ a decrementing counter that represents the predetermined time period. If the counter expires (e.g., counter reaches a zero value) before the receipt of a new base safe-zone broadcast, the portable safe-zone beacon may determine it is outside of the base-safe zone. This counter functionality may be similar to the base alarm counter and portable alarm counters described below with reference to FIGS. 2B and 3B.

Alternatively, the portable safe-zone beacon may receive input data that indicates the portable safe-zone beacon is outside of the base safe-zone. For example, the asset owner may push a portable safe-zone beacon button/toggle/switch/graphical user interface element that the portable safe-zone beacon identifies as an indicator of being outside of the base safe-zone. In another embodiment, the portable safe-zone beacon may include a GPS chip capable of providing real-time location information (e.g., GPS coordinates) and may determine whether the portable safe-zone beacon is outside of the base safe-zone based on a comparison of current GPS coordinates to stored base safe-zone perimeter information (e.g., geo-fence data). Indicators of being outside of the base safe-zone may also be transmitted to the portable safe-zone beacon via short-range radio transmissions from connected (or paired) mobile devices, such as a Bluetooth-capable smartphone carried by the asset owner.

If the portable safe-zone beacon is still within the base safe-zone (i.e., determination block 204=No"), the portable safe-zone beacon may continually evaluate whether it is outside of the base safe-zone in determination block 204. If the portable safe-zone beacon is outside of the base safe-zone (i.e., determination block 204=Yes"), in block 206, the portable safe-zone beacon may begin periodically broadcasting short-range radio transmissions that indicate the portable safe-zone (or portable safe-zone broadcasts) and that are configured based on the operations in block 202. In an embodiment, each portable safe-zone broadcast may include a unique message identifier (e.g., a message number or a unique timestamp code), that the tracking device and/or portable safe-zone beacon may use to identify received and/or transmitted messages. For example, if the portable alarm counter expires, as described below, the tracking device may transmit a portable safe-zone alarm message that includes the unique identifier of the last received portable safe-zone broadcast.

In determination block 208, the portable safe-zone beacon may determine whether it has re-entered the base safe-zone. As described above with reference to determination block 204, the portable safe-zone beacon may determine whether it is within the base safe-zone based on receiving base safe-zone broadcasts via short-range radio transceiver, GPS coordinates of the portable safe-zone beacon that indicate a location within the base safe-zone perimeter, and/or received input data indicating presence within the base safe-zone. If the portable safe-zone beacon determines it is back within the base safe-zone (i.e., determination block 208="Yes"), the portable safe-zone beacon may continue with the operational loop with the operations in determination block 204. If the portable safe-zone beacon determines it is still outside of the base safe-zone (i.e., determination block 208="No"), the portable safe-zone beacon may continue to transmit portable safe-zone broadcasts in block 206.

In an embodiment, when outside of the base safe-zone, the portable safe-zone beacon may emit a sound, vibrate, or display some visual indication. For example, if the portable safe-zone beacon includes a graphical display (e.g., LED display unit), the portable safe-zone beacon may render a message or display a color (e.g., red for outside the base safe-zone as opposed to green for within the base safe-zone) that may inform the asset owner of being outside of the base safe-zone. As other examples, when determined to be outside the base safe-zone, the portable safe-zone beacon may audibly beep, buzz, or vibrate.

Figure 2B:
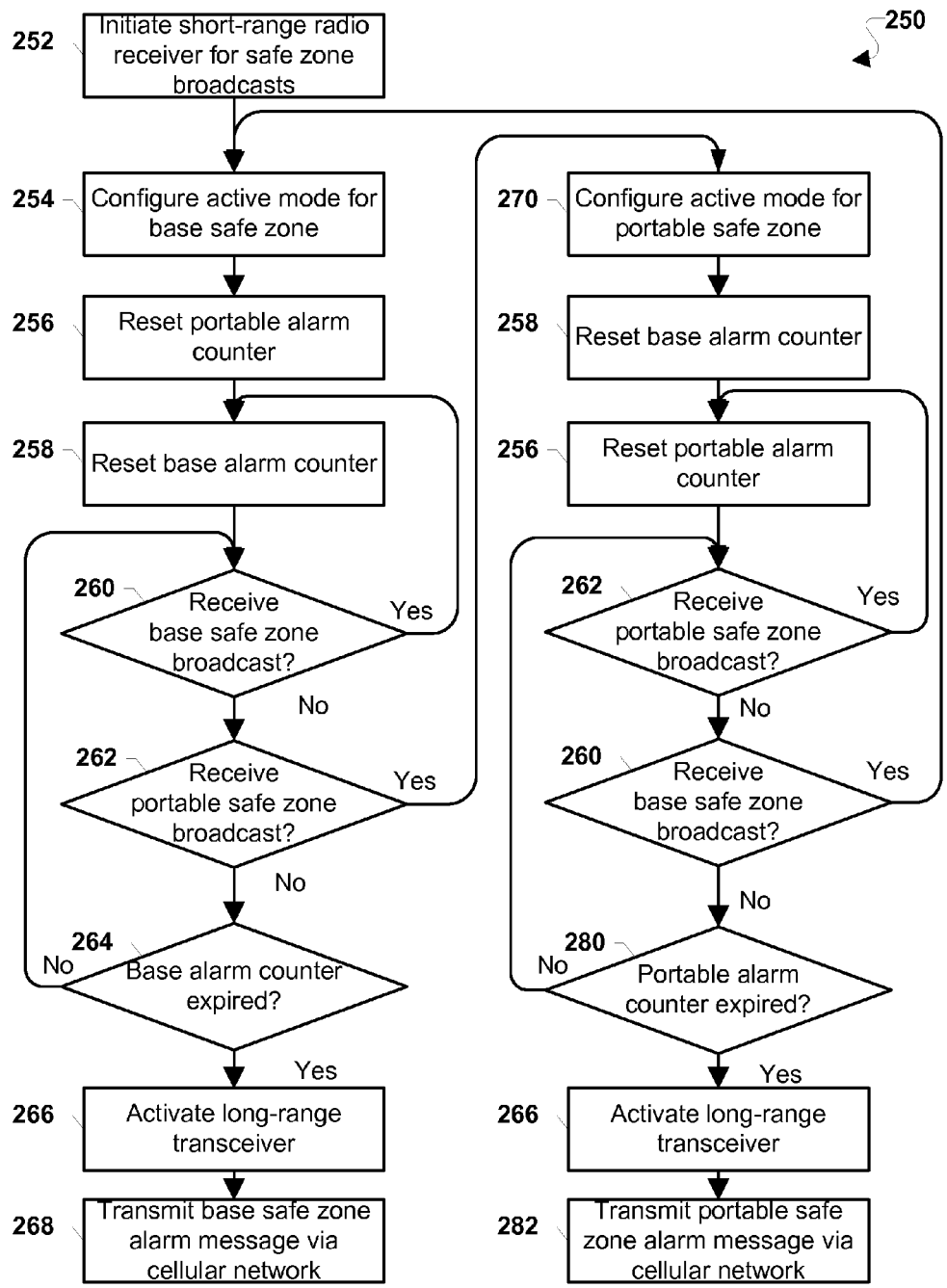
FIG. 2B is a process flow diagram illustrating an embodiment method for a tracking device receiving various safe-zone broadcast transmissions.

FIG. 2B illustrates an embodiment method 250 for a tracking device receiving and processing base and portable safe-zone broadcasts. The tracking device may include a short-range radio transceiver configured to continually receive short-range radio transmissions, such as various safe-zone broadcasts. While receiving valid safe zone broadcasts, the tracking device may determine itself to be within a safe zone and thus may suppress the activation of its long-range (or high-power) radio and the transmission of alarm messages. The tracking device may be configured to operate in different modes of activity (i.e., low-power modes) based on information identified within received safe-zone broadcasts. For example, portable safe-zone broadcasts may instruct the tracking device to operate in portable low-power mode and execute routines different than when configured to be in base low-power mode.

The tracking device may store in local memory at least two alarm counters (or alarm counter system variables) that the tracking device may periodically decrement to represent the passage of time. The alarm counters may indicate periods of time before the tracking device activates the long-range transceiver to transmit alarm messages. In other words, while an alarm counter is not zero (e.g., alarm counter value is greater than zero), the tracking device may not transmit an alarm message. In an embodiment, the alarm counters may represent tracking device processor cycles, or any other procedural metric the tracking device may utilize to monitor periods of activity and the occurrence of events therein.

The tracking device may store an alarm counter for each recognized safe-zone. For example, there may be an alarm counter for the base safe-zone (or the base alarm counter) and a different alarm counter for the portable safe-zone (or the portable alarm counter). In an embodiment, the tracking device may maintain an alarm counter for multiple base safe-zone beacon devices and portable safe-zone beacons (e.g., alarm counters for portable safe-zone beacons A and B and base safe-zone beacons 1 and 2, etc.). The tracking device may only actively assess and decrement the alarm counter corresponding to the tracking device's low-power mode (or corresponding to the current safe-zone). For example, if the low-power mode is configured to represent 'base low-power mode', the current safe-zone is the base safe-zone and the tracking device may only decrement the base alarm counter.

In block 252, the tracking device may initiate (or activate) the short-range radio transceiver and begin receiving and processing short-range radio transmissions. In various embodiments, the tracking device may be activated whenever powered by a power source (e.g., battery) or based on received user input data (e.g., power button interactions, etc.).

In block 254, the tracking device may begin the execution of an operational loop in a low-power mode while receiving base safe-zone broadcasts. In block 254, the tracking device may configure the low-power mode by setting a system variable to indicate the tracking device is within the base safe-zone. The base low-power mode setting for the low-power mode may be a default value for the low-power mode system variable. In block 256, as the low-power mode is configured for the base safe-zone, the tracking device may reset the portable alarm counter. For example, the portable alarm counter value may be reset to a default, initial value to represent that the portable alarm counter has not been decremented by the tracking device. While the low-power mode indicates base safe-zone activity, the tracking device may not decrement the portable alarm counter. In block 258, the tracking device may also reset the base alarm counter to its default or initial value.

In determination block 260, the tracking device may determine whether a base safe-zone broadcast is received via the short-range radio transceiver. During a period of time, the tracking device may receive various messages via the tracking device's short-range radio transceiver, such as base safe-zone broadcasts, portable safe-zone broadcasts, and/or random transmissions from devices unrelated to any safe zone. In response to receiving such signals, the tracking device may parse and evaluate the received messages' data to determine the identities of the transmitting devices. For example, the tracking device may evaluate header data within received messages to find the transmitting device's serial number, MAC address, or other identifying information/code.

The tracking device may compare the determined identities of the transmitting devices of received messages to a locally-stored database containing identifying information describing devices associated with recognized safe-zones.

For example, the database may contain data entries including serial numbers for the base safe-zone beacon and the portable safe-zone beacon. If the identifying information of the transmitting device of a received message matches a base safe-zone (e.g., base safe-zone beacon) entry within the database, the tracking device may determine a base safe-zone broadcast was received. Alternatively, the tracking device may determine whether the received message is a base safe-zone broadcast based on data within the message describing the base safe-zone. For example, the received message may not contain any identifying information about the base safe-zone beacon transmitting the base safe-zone message, but instead may contain a special code (or identifier) for the base safe-zone recognized by the tracking device.

In an embodiment, the database may also contain information describing various characteristics of the low-power mode appropriate for the recognized safe-zones corresponding to the received safe-zone beacon. For example, a database record regarding the base safe-zone beacon may include the default (or reset) low-power mode base alarm counter value, geo-fence information (or coordinates), and identifying information for other devices associated with the base safe-zone. In an embodiment, the tracking device may maintain separate data tables for recognized safe-zone low-power modes and safe-zone beacons.

If the tracking device determines it has received a base safe-zone broadcast (i.e., determination block 260="Yes"), the tracking device may confirm that it is located within the base safe-zone and continue the low-power mode operational loop by resetting the base alarm counter in block 258.

However, if a base safe-zone broadcast was not received (i.e., determination block 260="No"), in determination block 262, the tracking device may determine whether a portable safe-zone broadcast has been received. The tracking device may evaluate received messages to identify transmitting devices and detect portable safe-zone broadcasts using operations similar to as described above.

In an embodiment, the tracking device may not initially store a database record for the portable safe-zone beacon or the portable safe-zone. In such a case, a comparison of the identity of the received message's transmitting device (e.g., the portable safe-zone beacon) to database entries may not result in a match. Accordingly, if a match cannot be found in the stored database of recognized devices, the tracking device may instead analyze received messages for secret words or passwords that indicate that the transmitting device (e.g., the portable safe-zone beacon) is related to a valid safe-zone for the tracking device. For example, the tracking device may receive a message including a key code known only to the tracking device and the base safe-zone beacon, such as a base safe-zone identifier. If a received message contains such verifying information, the tracking device may append the transmitting device identity (e.g., the portable safe-zone beacon) to the database, along with any associated characteristics and/or operating parameters for the related portable safe-zone. In subsequent received messages from the now-known safe-zone beacon, the tracking device may forgo evaluating received message data for secret passwords/codes, as the transmitting device has already been authenticated by the tracking device.

If the no portable safe-zone broadcast has been received (i.e., determination block 262="No"), in determination block 262, the tracking device may determine whether the base alarm counter has expired. In other words, the tracking device may determine whether there is time remaining before the alarm mode is entered and alarm message transmissions should begin. If the base alarm counter has not expired or is a non-zero value (i.e., determination block 264="No"), the tracking device may continue with the low-power mode operations in determination block 260.

If the base alarm counter has expired while the tracking device is configured to be in the base low-power mode (i.e., determination block 264="Yes"), the tracking device may detect that a breach event occurred, and thus, in block 266, may activate the alarm mode, which may involve energizing a GPS receiver and a long-range transceiver. As described above, the tracking device's battery service life may diminish more rapidly while in the alarm mode due to the battery drain of the long-range transceiver and GPS receiver that are activated in this mode. While in the alarm mode in block 268 the tracking device may use the activated long-range transceiver to transmit a base safe-zone alarm message via a cellular network. The tracking device may be configured to transmit the base safe-zone alarm message via any available long-range wireless data or communications network, including a Wi-Fi local area network, wireless wide area network, or a satellite communications link.

If a portable safe-zone broadcast has been received (i.e., determination block 262="Yes"), in block 270, the tracking device may configure the low-power mode in a manner that is different than when the tracking device is receiving the base safe-zone beacon signal. In an embodiment, the low-power mode while the tracking device receives the portable safe-zone beacon may involve various operational or scheduling processes that result in a different low-power mode functionality than when the tracking device is in the low-power mode while receiving the base safe-zone beacon. For example, while operating in a portable low-power mode, the tracking device may increase the frequency at which internal sensor units (e.g., accelerometers) are polled to better assess the level of activity of the asset while outside of the base safe-zone. As another example, when configured to operate in the portable low-power mode, the tracking device may employ a longer duration alarm counter than when operating in the base safe-zone low-power mode. As another example, the type of alarm message that the tracking device will transmit in the subsequent alarm mode (i.e., when an alarm counter expires following a breach event) may be different from the alarm message that the tracking device will transmit in the subsequent alarm mode following a breach event while in the portable low-power mode. As described above, operational and scheduling adjustments in response to the low-power mode configuration may be defined by the protocol file described above.

In block 258, the base alarm counter may be reset and not actively decremented by the tracking device, and in block 256, the tracking device may reset the portable alarm counter to its default value. As described above, in determination block 262, the tracking device may periodically analyze received short-range radio transmissions to determine whether portable safe-zone broadcasts have been received. If a portable safe-zone broadcast is received (i.e., determination block 262="Yes"), the tracking device may reset the portable alarm counter in block 256 and continue to receive and process messages.

If a portable safe-zone broadcast is not received (i.e., determination block 262="No"), in determination block 260, as described above, the tracking device may determine whether any base safe-zone broadcasts have been received. If a base safe-zone broadcast is received (i.e., determination block 260="Yes"), the tracking device may configure itself to operate in base low-power mode and continue with the operations in block 254. However, if neither a base safe-zone broadcast nor a portable safe-zone broadcast is received (i.e., determination block 260="No"), the tracking device may determine whether the portable alarm counter has expired following a breach event in determination block 280. If the portable alarm counter has not expired (i.e., determination block 280="No"), the tracking device may continue to evaluate received messages with the operations in determination block 262. If the portable alarm counter has expired following a breach event (i.e., determination block 280="Yes"), the tracking device may enter the alarm mode and proceed to activate the long-range transceiver in block 266 and transmit a portable safe-zone alarm message in block 282.

As described above, the portable safe-zone alarm message characteristics may be different from the base safe-zone alarm message as described above, possibly including different information (e.g., text information to recipients, alarm level indicators, etc.), different recipients (e.g., cellular phone numbers, email addresses, etc.), different transmission formats (e.g., email, SMS message, audio message, etc.) and different transmissions schedules (e.g., how many times transmitted per minute, etc.).

In an embodiment, if the tracking device transitions from the base safe-zone low-power mode to the portable safe-zone low-power mode (or vice versa) based on a received safe-zone beacon signal, the tracking device may wait a predetermined period of time before evaluating if another similar broadcast is received. As an example, if the low-power mode is configured to operate in portable low-power mode from base low-power mode based on the receipt of a portable safe-zone broadcast, the tracking device may not immediately evaluate if another portable safe-zone broadcast has been received.

Figure 3A:
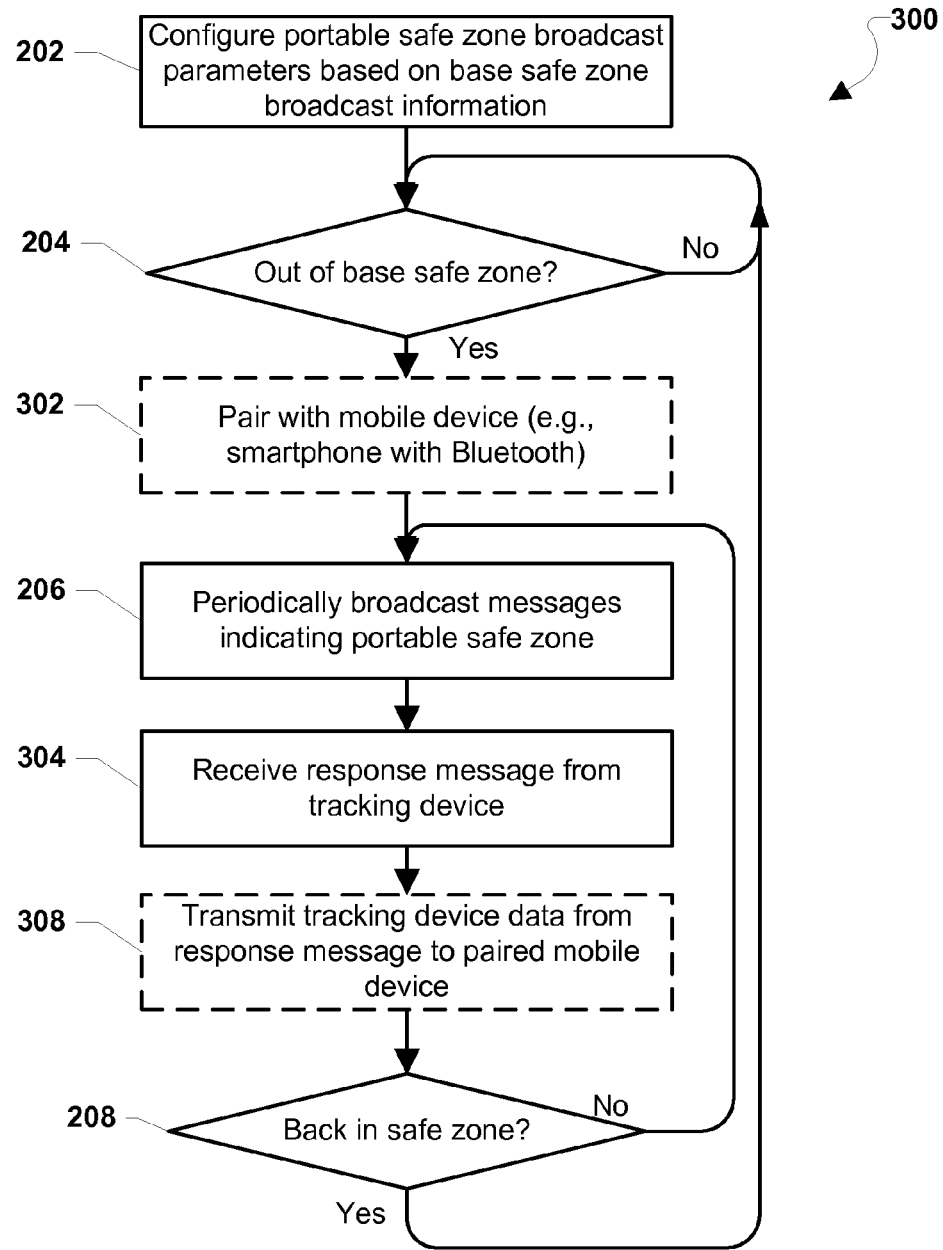
FIG. 3A is a process flow diagram illustrating an embodiment method for a portable safe-zone beacon broadcasting and receiving response transmissions from a tracking device.

FIG. 3A illustrates an embodiment method 300 for a portable safe-zone beacon broadcasting and receiving response transmissions from a tracking device. Unlike in embodiment method 200, the portable safe-zone beacon may exchange short-range radio transmissions with the tracking device with method 300. By communicating in a bi-directional manner, the portable safe-zone beacon may receive data describing the activity of the tracking device, which the portable safe-zone beacon may store and use for customizing further communications with the tracking device and/or other devices associated with the portable safe-zone beacon.

As described above, in block 202, based on the receipt of short-range radio transmissions from the base safe-zone beacon (i.e., base safe-zone broadcasts), the portable safe-zone beacon may configure the parameters of the portable safe-zone broadcasts that define the portable safe-zone. In determination block 204, the tracking device may determine whether the asset is outside of the base safe-zone. While the portable safe-zone beacon is within the base safe-zone (i.e., determination block 204="No"), the portable safe-zone beacon may continually evaluate any received short-range radio transmissions to determine whether they were transmitted from the base safe-zone beacon.

If the portable safe-zone beacon is outside of the base safe-zone (i.e., determination block 204="Yes"), in optional block 302, the portable safe-zone beacon may include a second short-range radio transceiver, such as a Bluetooth, ANT/ANT+, Peanut, etc., and may pair with a nearby mobile device employing similar communication protocols. For example, the asset owner may carry the portable safe-zone beacon and a smartphone that both are configured to pair and exchange Bluetooth LE messages. Such pairing operations may be create secure communications between authorized devices and are well-known in the art. In an embodiment, the portable safe-zone beacon may exchange locally-stored data, such as information transmitted by the tracking device, with the paired mobile device. Further, the mobile device may store, organize, process, and otherwise utilize exchanged data with the portable safe-zone beacon, and may execute specialized software (e.g., an app) associated with the safe-zone data.

In block 206, as described above, the portable safe-zone beacon may utilize its short-range radio transceiver to transmit portable safe-zone broadcasts, configured to indicate the presence of the portable safe-zone to the tracking device. In block 304, the portable safe-zone beacon may receive a response message from the tracking device based on portable safe-zone broadcasts. The response message may contain data indicating the portable safe-zone broadcast message to which the tracking device is responding (e.g., unique broadcast identifier), as well as various data describing the current state of the tracking device. For example, the response message may include the power status of the tracking device battery, diagnostics information (e.g., component or radio fail state information), and data collected from sensor units within the tracking device (e.g., accelerometer data, temperature measurements, magnetometer data, GPS coordinates, etc.).

The response message may also include metadata instructions for formatting or otherwise utilizing the response message information within specialized or associated software. For example, the response message may contain software methods or calls for use within a mobile app related to the tracking device and/or safe-zones. The portable safe-zone beacon may analyze the data within the response message, and may adjust the scheduling of subsequent portable safe-zone broadcasts in response to the analysis. For example, based on the response message that indicates that the tracking device is currently encountering a high amount of activity (e.g., dynamic motion data via accelerometers) or is located at the edge of the portable safe-zone (e.g., tracking device GPS coordinates are nominally within the portable safe-zone geo-fence perimeter), the portable safe-zone beacon may decrease the time period for transmitting subsequent portable safe-zone broadcasts.

In an embodiment, based on received response messages, the portable safe-zone beacon may also modify the data transmitted within portable safe-zone broadcasts. For example, if the response message from the tracking device indicates that the tracking device is receiving broadcasts from multiple devices, the portable safe-zone beacon may generate future portable safe-zone broadcasts that include instructions for the tracking device to disregard transmissions from other devices (e.g., unsanctioned devices attempting to spoof the portable safe-zone broadcasts).

Returning to FIG. 3A, in optional block 308, the portable safe-zone beacon may transmit tracking device data from the response message to the paired mobile device. For example, the portable safe-zone beacon may relay tracking device activity information (e.g., accelerometer data) to a smartphone via Bluetooth transmissions. The mobile device may store the data and/or process tracking device information with specialized software (e.g., app) or within a database related to the safe-zone. In an embodiment, the response message may contain instructions directing the portable safe-zone beacon to relay information to the paired mobile device or other associated devices. For example, the portable safe-zone beacon may transmit a Bluetooth message to the paired mobile device based on instructions information within the response message. As another example, the portable safe-zone beacon may transmit a message to the mobile device directing it to transmit an email or SMS message on behalf of the tracking device.

In determination block 208, the portable safe-zone beacon may determine whether the asset is again within the base safe-zone based on received base safe-zone broadcasts. If back within the base safe-zone (i.e., determination block 208="Yes"), the portable safe-zone beacon may continue with the operations in determination block 204. If the portable safe-zone beacon is not back within the base safe-zone (i.e., determination block 208="No"), the portable safe-zone beacon may continue to periodically transmit portable safe-zone broadcasts in block 206.

Figure 3B:
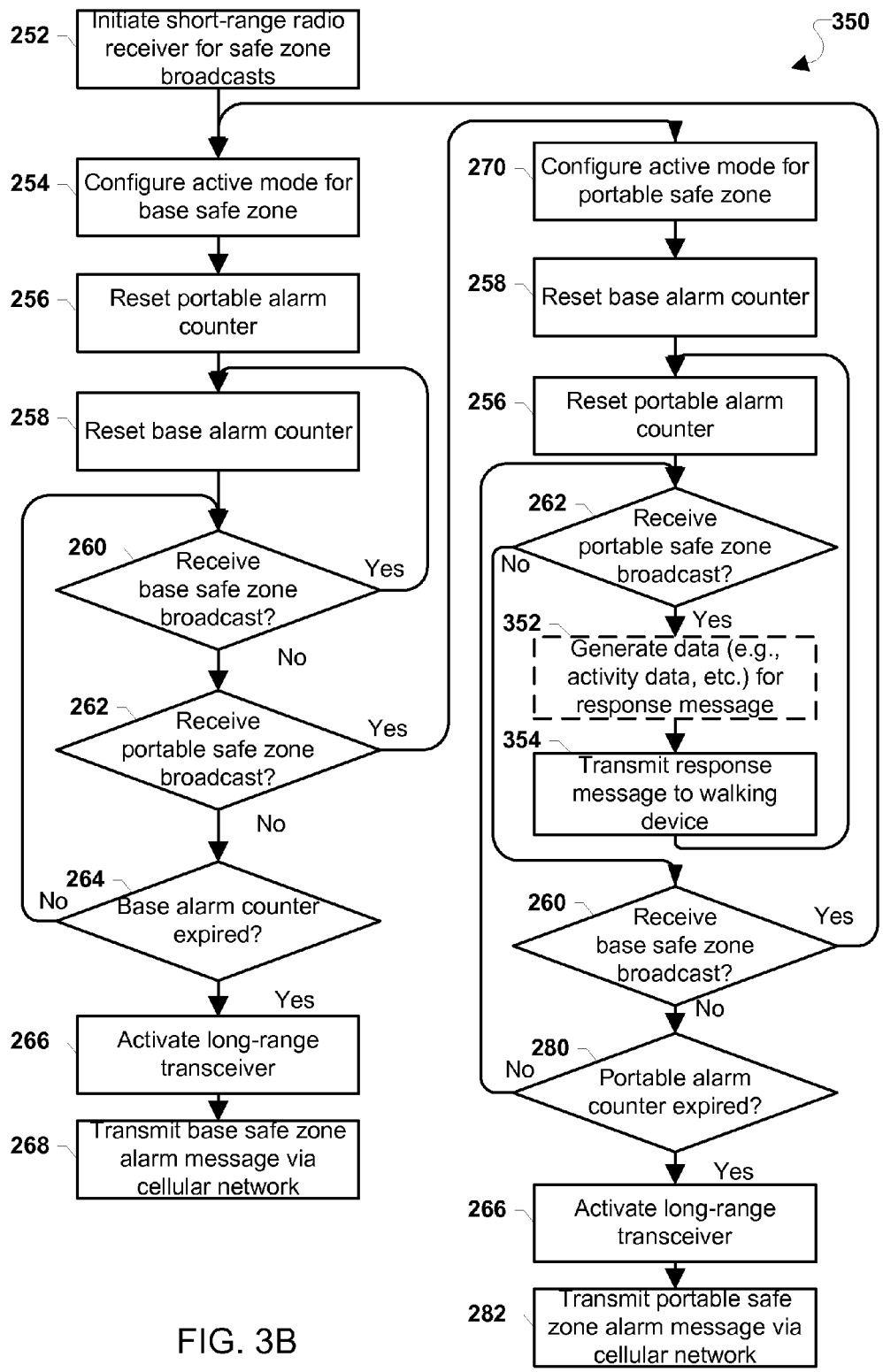
FIG. 3B is a process flow diagram illustrating an embodiment method for a tracking device receiving various safe-zone broadcast transmissions, generating activity data, and transmitting response messages to a portable safe-zone beacon.

FIG. 3B illustrates an embodiment method 350 for a tracking device receiving various safe-zone broadcast transmissions, generating activity data, and transmitting response messages to a portable safe-zone beacon. The method 350 is similar to the method 250 and operations described above, with the exception that the tracking device may generate and transmit short-range radio response messages configured to be received and processed by the portable safe-zone beacon. The response messages, as indicated above with reference to FIG. 3A, may include various data describing the activities, status, and location of the tracking device. Such information may be used by the portable safe-zone beacon for internal calculations or for relaying data to a mobile device.

In block 252, the tracking device may initiate the short-range radio transceiver for receiving safe-zone broadcasts from either a base safe-zone beacon or the portable safe-zone beacon, and, in block 254, may configure a base low-power mode. As described above, configuring the base low-power mode may involve setting a system variable and utilizing a protocol file that defines how the tracking device should operate while receiving and processing various safe-zone broadcasts. In block 256, the tracking device may reset the portable alarm counter and in block 258 also reset the base alarm counter. The tracking device may determine whether it has received a base safe-zone broadcast in determination block 260 and, if so (i.e., determination block 260="Yes"), the tracking device may continue with the operations in block 258.

If no base safe-zone broadcast has been received (i.e., determination block 260="No"), the tracking device may determine whether a portable safe-zone broadcast has been received in determination block 262. If not (i.e., determination block 262="No"), the tracking device may determine whether the base alarm counter has expired in determination block 264. If the base alarm counter has expired (i.e., determination block 264="Yes"), the tracking device may activate the long-range transceiver in block 266 and in block 268 transmit a base safe-zone alarm message generated based on the protocol file and base low-power mode setting. Alternatively, if the base alarm counter has not expired (i.e., determination block 264="No"), the tracking device may continue to determine whether base safe-zone broadcasts are received in determination block 260.

If a portable safe-zone broadcast is received (i.e., determination block 262="Yes"), in block 270, the tracking device may establish a portable low-power mode in which the tracking device may execute differently than when in base low-power mode, as described above. In block 258, the tracking device may reset the base alarm counter and in block 256 reset the portable alarm counter. In determination block 262, the tracking device may determine whether a portable safe-zone broadcast is received. If not (i.e., determination block 262="No"), in determination block 260, the tracking device may determine whether a base safe-zone broadcast has been received. If so (i.e., determination block 260="Yes"), the tracking device may continue with the operations in block 254. If not (i.e., determination block 260="No"), in determination block 280, the tracking device may determine whether the portable alarm counter has expired. If the portable alarm counter has not expired (i.e., determination block 280="No"), the tracking device may continue with the operations in determination block 262. If the portable alarm counter has expired (i.e., determination block 280="Yes"), the tracking device may activate the long-range transceiver in block 266 and in block 282 transmit a portable safe-zone alarm message generated based on the protocol file and portable low-power mode setting.

However, if a portable safe-zone broadcast is received (i.e., determination block 262="yes"), in optional block 352, the tracking device may generate activity data in response to receiving the portable safe-zone broadcast. For example, the tracking device may poll motion sensing units (e.g., accelerometers, gyroscopes, etc.) and other on-board sensors to gather data representing the current status of the asset. In block 354, the tracking device may generate and transmit a response message to the portable safe-zone beacon. In an embodiment, the tracking device may broadcast the response message or, alternatively, may transmit the response message explicitly to the portable safe-zone beacon based on identification information within the portable safe-zone broadcasts. Response messages contents and use by the portable safe-zone beacon are described in detail above with reference to FIG. 3A.

In an embodiment, response messages containing the various tracking device data may be transmitted to the base safe-zone beacon. For example, when in receipt of a base safe-zone broadcast (i.e., determination block 260="Yes" while in base low-power mode), the tracking device may transmit activity data for storage and/or use within the base safe-zone beacon. The data gathered for inclusion in a response message to the base safe-zone beacon may be different from information within a response message to the portable safe-zone beacon. For example, if the base safe-zone encompasses a larger area than the portable safe-zone due to more powerful short-range radio transmissions by the base safe-zone beacon, response messages to the base safe-zone beacon may include GPS coordinates of the tracking device. Alternatively, no coordinates may be necessary to define the location of the tracking device within the smaller portable safe-zone.

In an embodiment, the tracking device may transmit information describing the base or portable alarm counters. For example, response messages may contain the value of the base alarm counter at the time of transmitting the response message. If the portable safe-zone beacon is not actively transmitting portable safe-zone broadcasts (e.g., the portable safe-zone beacon is within the base safe-zone) but receives a response message indicating that the tracking device's base alarm counter is about to expire, the portable safe-zone beacon may transmit portable safe-zone broadcasts to prevent the tracking device transmitting an alarm message. This scenario may occur if while within the base safe-zone, the tracking device does not receive base safe-zone broadcasts due to transmissions interference, etc.

Figure 4:
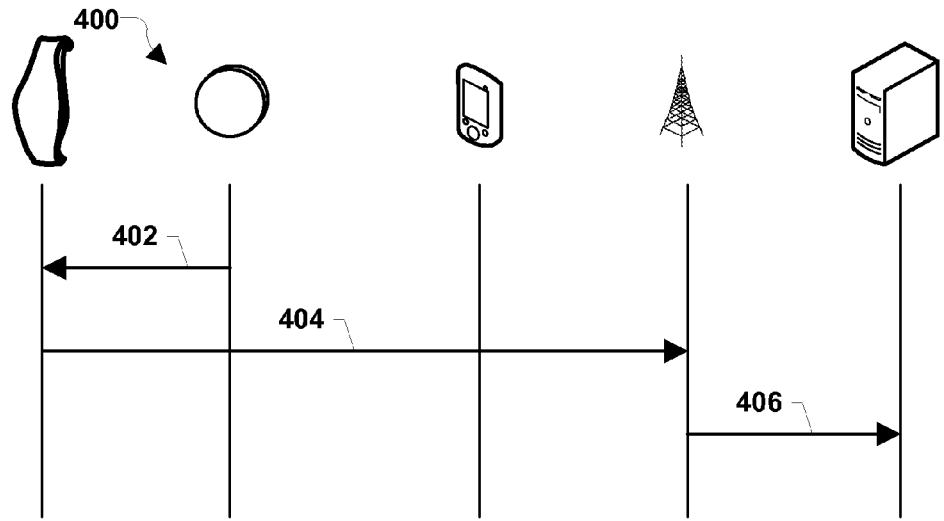
FIG. 4 is a call flow diagram for a tracking device transmitting an alarm message through a cellular network in accordance with various embodiments.

FIG. 4 illustrates a call flow 400 for a tracking device transmitting an alarm message through a cellular network in accordance with various embodiments. Although the following description describes the transmission of a portable alarm message, the tracking device may transmit a base alarm message in a similar manner. A portable safe-zone beacon may transmit a short-range radio transmission (i.e., portable safe-zone broadcast) 402 for receipt by the tracking device. If the broadcast 402 is not received before the portable alarm counter expires due to the asset being out of broadcast range, the tracking device may transmit a portable alarm message as a long-range transmission 404 via a long-range radio transceiver. The long-range transmission 404 may be received by a network device, such as a cellular tower, that may relay the portable alarm message via a transmission 406 to a server. In an embodiment, the server may store the portable alarm message, evaluate the characteristics of the portable alarm message, and execute various routines based on determined alarm characteristics. For example, based on parsing and processing data within the received portable alarm message, the server may determine the alarm a high urgency and transmit communications to emergency services. The server may utilize a protocol file for processing alarms similar to the protocol file described above with reference to the portable safe-zone beacon and a base safe-zone beacon processing expired alarm counters for the various safe-zones.

Figure 5:
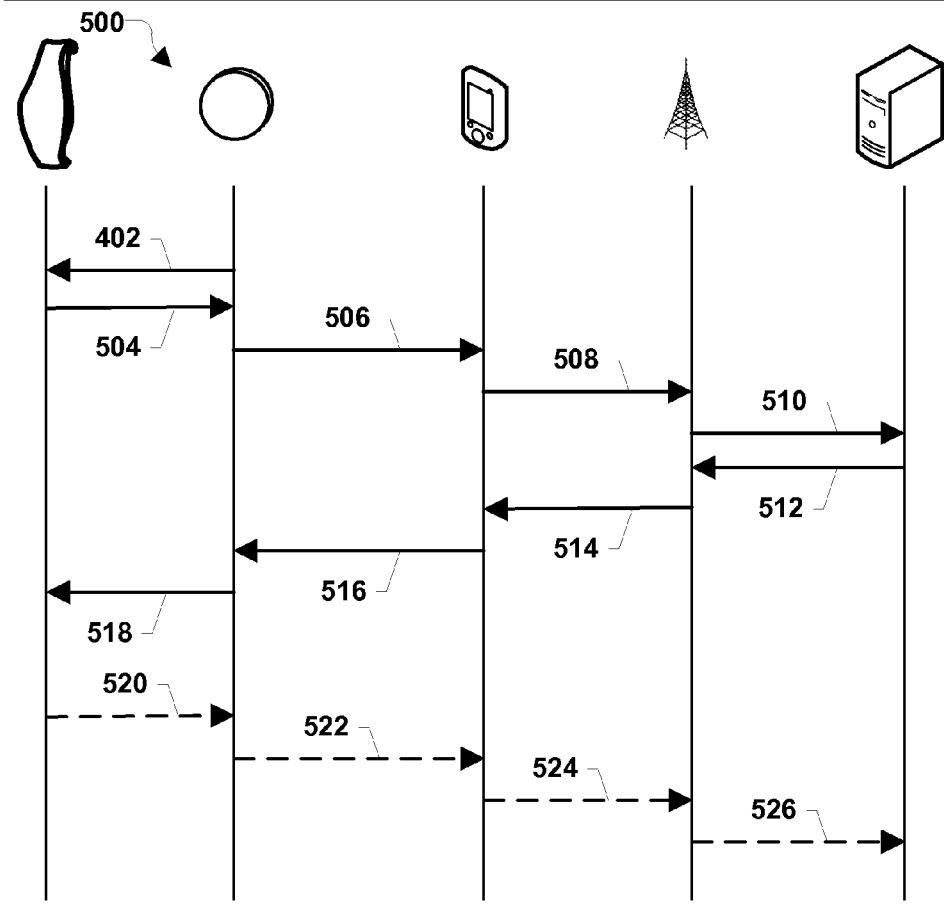
FIG. 5 is a call flow diagram for a tracking device exchanging data with various network devices through communications with a portable safe-zone beacon in accordance with various embodiments.

FIG. 5 illustrates a call flow 500 for a tracking device exchanging data with various network devices through communications with a portable safe-zone beacon in accordance with various embodiments. Unlike as described in FIG. 4, the call flow 500 may involve bi-directional transmissions between the portable safe-zone beacon and tracking device. Additionally, the tracking device may not transmit any alarm message. With data returned by the tracking device via a response message as described above, the portable safe-zone beacon may relay status information to a server that may respond with input, instructions, and other data for use in the tracking device and other devices of the call flow 500.

As described above, a portable safe-zone beacon may transmit a short-range radio transmission (i.e., portable safe-zone broadcast) 402 for receipt by the tracking device within the portable safe-zone. If the broadcast 402 is received before the portable alarm counter expires, the tracking device may transmit a response message 504 to the portable safe-zone beacon via short-range radio transceiver. The response message may contain data, including tracking device sensor data describing asset activity, communications information, identification data, location coordinates, etc.

Upon receipt of the response message 504, the portable safe-zone beacon may process the response message data. If the portable safe-zone beacon has paired with a mobile device (e.g., established a Bluetooth bond), the portable safe-zone beacon may transmit a short-range radio message 506 to the mobile device that may be stored, processed, and/or otherwise used in combination with software executing on the mobile device. For example, a smartphone mobile device may use the message 506 contents within a safe-zone app executed by the mobile device processor. In turn, the mobile device may transmit a long-range communication 508 via long-range transceiver (e.g., Wi-Fi radio, cellular network modem, etc.). A network device, such as a cellular tower or a Wi-Fi router, may receive the long-range communication 508 and relay data to a server via another transmission 510.

The server may process the received data originating from the tracking device. Based on data within the received transmission 510, the server may generate a return message 512 to be delivered to the tracking device. For example, analyzing the data from the received transmission 510, the server may determine that the tracking device is executing out-of-date software (e.g., firmware), and may package an update file/executable within the return message 512 for execution within the tracking device.

In an embodiment, the server may perform analytics on data within the received transmission 510 and evaluate previous operations of the tracking device. For example, the transmission 510 may contain statistical information about the tracking device's reported activity (e.g., sensor measurements, coordinates, etc.) at various times that the server may compare to transmitted alarm messages by the tracking device as well as current operating parameters (e.g., the tracking device's portable alarm counter default value). In an embodiment, the server may maintain data from the tracking device as well as multiple different tracking devices and may calculate statistics based on data from some or all of these devices. Based on the analytics and stored data, the server may generate a return message for the tracking device that includes data that instructs the tracking device to adjust its current operating parameters, change the protocol file, or otherwise modify how the tracking device receives, interacts with, and responds to portable or base safe-zone broadcasts.

The network device (e.g., cellular tower) may receive the return message 512 from the server and relay the data to the mobile device as a wireless transmission 514. Via a short-range, paired transmission 516, the mobile device may deliver the server return message to the portable safe-zone beacon, which in turn may transmit the data to the tracking device via another short-range radio transmission 518. Upon receipt, the tracking device may parse the return message from the server and may use the included data to update software (e.g., firmware), set various system variables (e.g., base or portable alarm counters), change instruction sets (e.g., modify the protocol file), and otherwise execute instructions based on the return message contents. In an optional embodiment, the tracking device may transmit a confirmation of receipt to the server relayed through various transmissions 520, 522, 524, and 526.

In an embodiment, the data, information, or instructions within the return message by the server may be utilized, stored, and otherwise performed by any of the devices within the communication call flow. For example, the mobile device may receive the return message as relayed by the cellular tower and may execute instructions within a safe-zone app. As another example, based on the return message from the server, the portable safe-zone beacon may adjust the frequency at which it transmits portable safe-zone broadcasts.

Figure 6A:
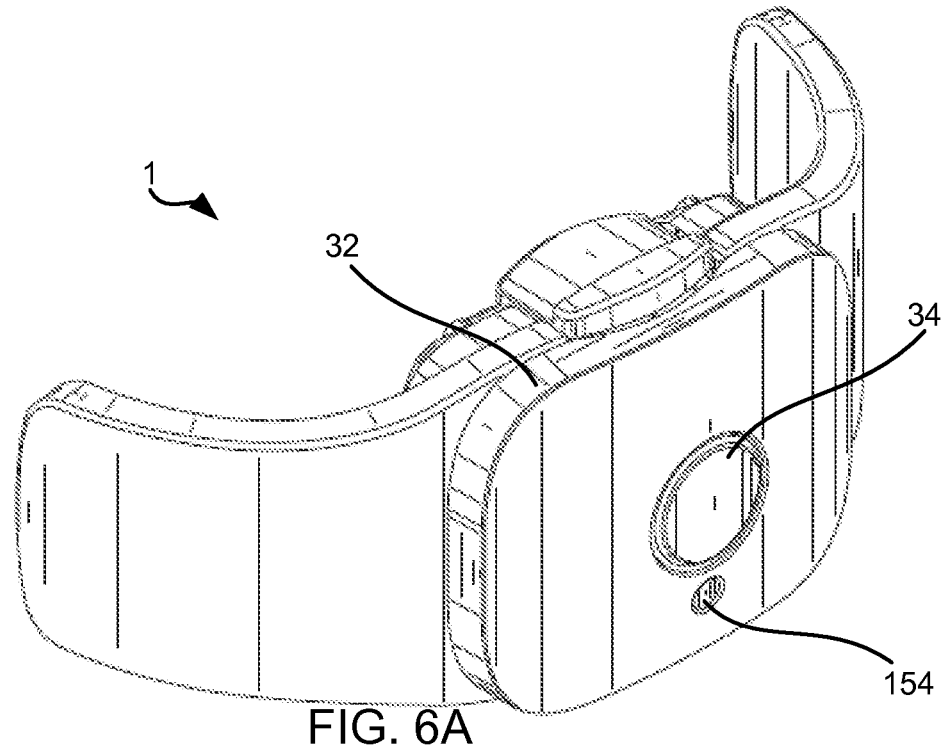
FIG. 6A is a perspective view of a tracking device according to an embodiment.
Figure 6B:
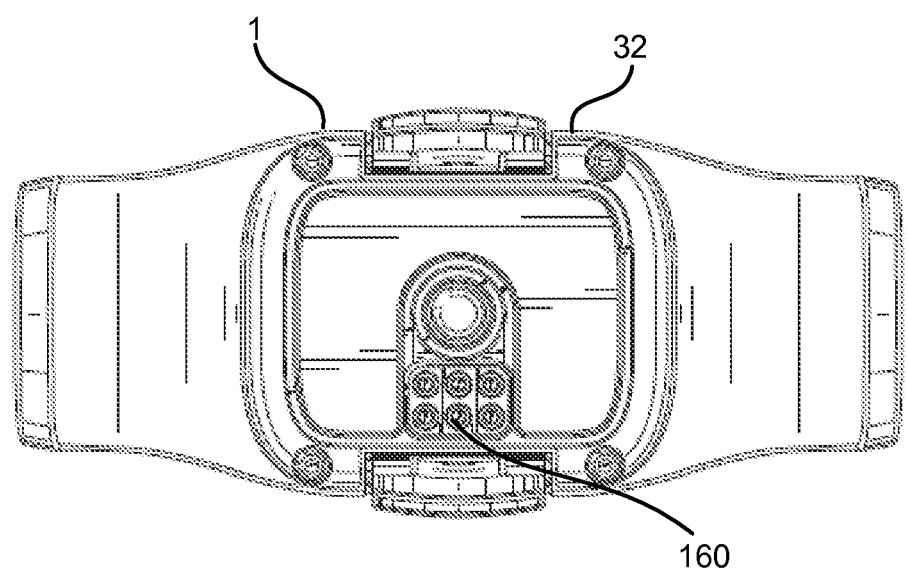
FIG. 6B is a bottom view of the embodiment tracking device illustrated in FIG. 6A.

FIGS. 6A and 6B illustrate a tracking device 1 in the form of a dog collar according to an embodiment. FIG. 6A is a perspective view of the tracking device 1 while FIG. 6B illustrates the bottom of the tracking device 1. The tracking device 1 includes a user input mechanism 34 and an indicator 154. The user input mechanism 34 may be, for example, a push button, a miniature keypad or another type of switch whose actuation may be sensed by a processor of the device. For additional security, the user input mechanism may be a keypad for entering a security code, such as a personal identification number (PIN). Alternatively, the user input mechanism 34 may be a transceiver configured to detect a radio frequency identification (RFID) tag or chip. For example, the RFID tag or chip may be located inside a leash close to where it attaches to a collar. In this example, when the lease is attached to the collar, the RFID tag or chip is close enough in proximity to the tracking device 1 to activate the user input mechanism 34 that triggers a processor of the tracking device to enter an operating mode, such as a safe-zone operating mode (e.g., base low-power mode or portable low-power mode).

The indicator 154 may inform the user of numerous states/modes relevant to the tracking device 1, such as tracking device 1 activation state (e.g., on/off/sleep, etc.), that a breach event has occurred, and that an alarm message is being/has been transmitted. The indicator 154 may produce a visual or audible indication or combination thereof. For example, the indicator may include one or more light emitting diodes (LEDs). A first LED may indicate that the tracking device has been activated, while a second LED may indicate that the tracking device 1 is in portable low-power mode. Alternatively, the indicator 154 may be a speaker that emits one or more beeps. In an embodiment, the tracking device 1 may include multiple indicators 154, including speakers, LED lights, and display screens.

The tracking device 1 also includes a housing 32 that houses the electronics of the device, including but not limited to, a transceiver, a processor, a memory, and a battery as described in more detail below. The housing 32 may be waterproof and shock resistant to protect the electronics from the environment. The housing 32 is configured so that the electronics can be serviced, such that worn or damaged parts may be replaced or repaired. Also shown in FIG. 6B are sockets 160 configured to receive pins from a charging station. In this manner, the internal battery may be recharged by connecting it to a charging station, which may also enclose the RF beacon transmitter. The sockets 160 may also be configured to enable a user to configure operating parameters of the tracking device through connections with a computer or other form of user interface, such as to set the time or durations of the first and second timers. As described below, in an alternative embodiment, the tracking device includes an inductive coil for recharging. In this embodiment, the sockets 160 may be omitted.

Figure 7A:
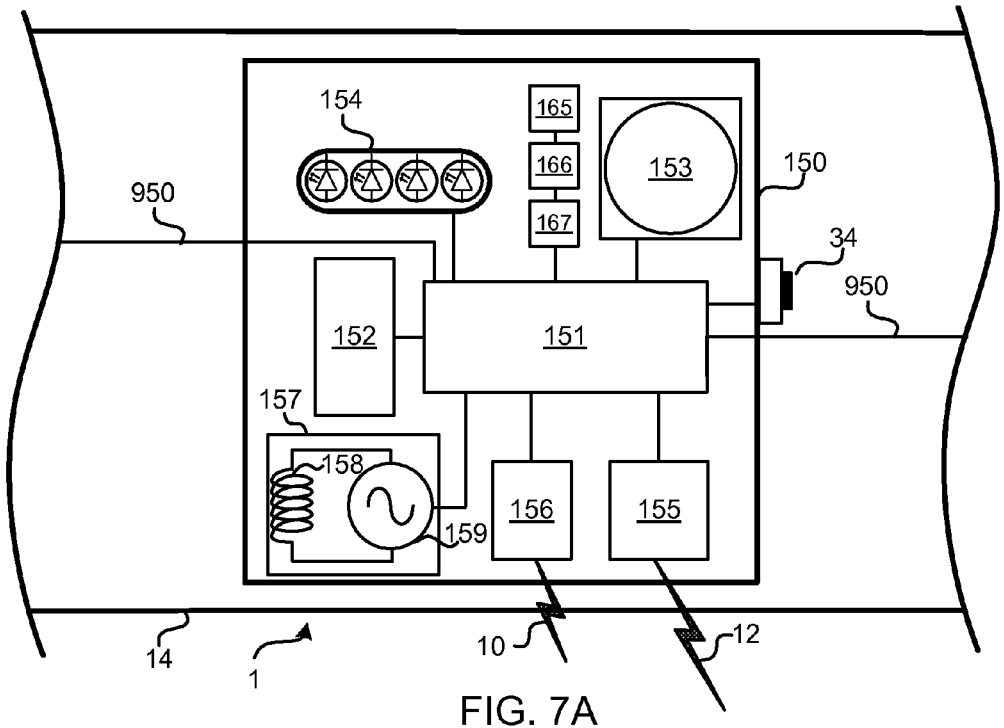
FIGS. 7A and 7B are component block diagrams of alternative embodiments of a tracking device with alternative components for recharging the tracking device with power.
Figure 7B:
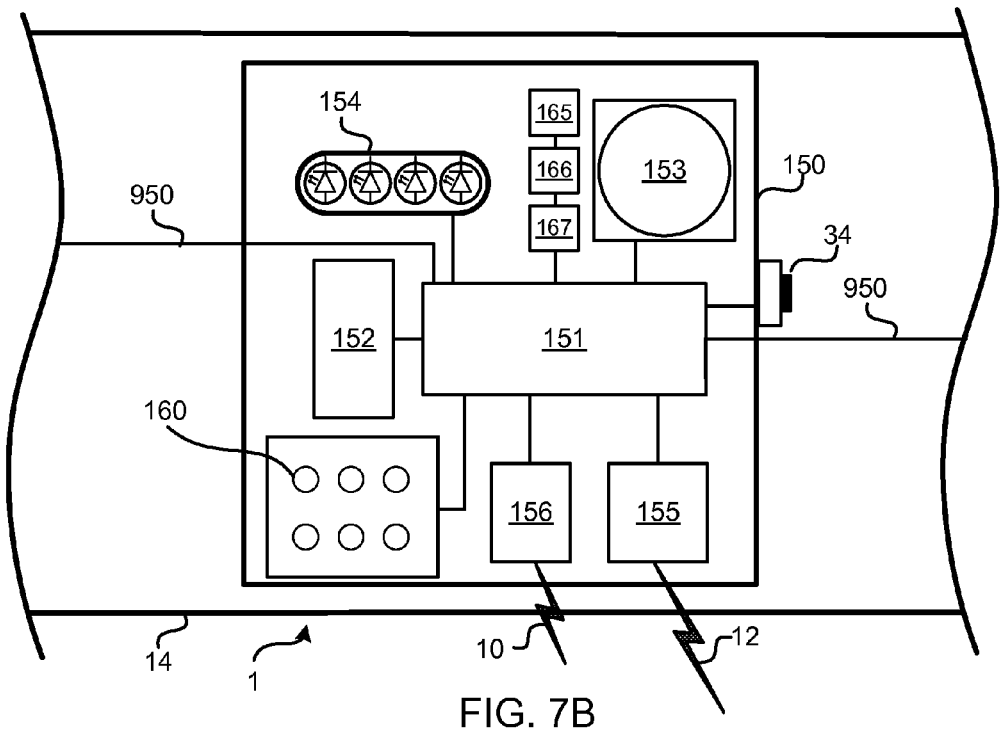

Example embodiments of tracking devices 1 are illustrated in FIGS. 7A and 7B. In the various embodiments, the tracking device 1 may include a tracking circuitry 150 that is sealed within a housing 32. The housing 32 may made of any suitable material such as plastic, rubber, stainless steel, etc. The tracking circuitry 150 may include a processor 151 coupled to memory 152 and a power source, such as a battery 153. In an embodiment, the tracking circuitry 150 may also include one or more light emitting diodes (LEDs) 154 that may be used to communicate operational status information. A long range transceiver 155 or high-power radio, such as a cellular data transceiver, may be coupled to the processor 151 and configured to establish communication links 12 with a long-range wireless network, such as a cellular data network 4. A short range radio 156 is also coupled to the processor 151 and configured to receive communication signals from RF beacons.

The tracking circuitry 150 may also include a user input mechanism 34 coupled to the processor 151, such as a button, small keypad or a switch. The processor 151 may be configured with processor-executable instructions to receive user inputs from the input mechanism and interpret the inputs (e.g., button press, entry of a PIN number, movement of a switch, etc.) as control inputs, such as a user input indicative of expected departure of the tracking device from a safe-zone. In an embodiment, the user input mechanism 34 may be an RFID tag or chip that can receive an RFID query signal.

The tracking circuitry 150 may also include an induction charging circuit element 157 so that the battery 153 may be recharged by placing the tracking device 1 in close proximity to an induction charging system. This embodiment enables the asset tracking device to be hermetically sealed. Such an induction charging element 157 may include an induction coil 158 coupled to a rectifier circuit 159. When an alternating magnetic field is applied to the coil 158, alternating electrical currents are induced in the coil and are rectified by the rectifier circuit 159 to output a charging voltage. The charging voltage may be regulated by the processor 151 and used to charge the battery 153. In an alternative embodiment illustrated in FIG. 7B, the induction charging circuit element 157 is replaced with electrical sockets 160 that are configured to accept pins to establish electrical connections with a charging station.

In an embodiment, the long range transceiver 155 (or high-power radio) may be a cellular data network transceiver. In another embodiment, the long range transceiver 155 may be configured to communicate with either or both wireless local-area networks (e.g., WiFi) and cellular telephone wireless wide-area networks. In another embodiment, the tracking device 1 may include both a long range transceiver 155 and a cellular telephone transceiver, which is not shown separately but may be represented in a similar manner in a component block diagram.

In addition to the processor 151, memory 152, and transceivers 155, 156, the tracking device 1 may include a mechanism for reliably determining when it is removed from an asset 9. A variety of removal detection mechanisms may be used.

In an example embodiment illustrated in FIG. 7A, a conductor 950 is provided that extends completely around the asset 9 (e.g., a wire embedded in a dog collar) and connects to two inputs of the processor 151. In this embodiment, the processor 151 may detect when the conductor 950 is severed, as may be required to remove the tracking device 1 from the asset. For example, as illustrated in FIG. 7A, the processor 151 may apply a positive voltage to one end of the conductor 950 coupled to the processor 151 as an output and test the voltage of the other end that is connected as an input to the processor 151. If the input voltage from the conductor 950 falls to near zero, this indicates that the conductor 950 has been severed as occurs when the tracking device 1 is removed from an asset 9. Such a conductor 950 may be in the form of a wire, a conductive trace, or a conductive ribbon that extends around a portion of the asset 9. For example, the conductor 950 may be in the form of a conductive trace within a dog collar that connects to the tracking device 1 in a manner that provides both an electrical connection on either end to the processor 151 and a physical strap that holds the tracking device 1 around the dog's neck.

In an embodiment, the tracking device may include various sensor units that may be connected to the processor 151 and memory 152 and configured to measure biometric and/or environmental attributes. For example, the tracking device may include sensors configured to measure physical accelerations, gravity indicators, or any other metrics of physical motion, such as an accelerometer 165 and a gyroscope 166. In another embodiment, the tracking device may also include physiological measurement units, such as a body temperature sensor 167, as well as devices configured to determine positional information (e.g., GPS coordinates) based on satellite communications.

In the various devices, the processor 151 used in an asset tracking device 1 may be any programmable microprocessor, microcomputer, or multiple processor chip or chips that may be configured by software instructions to perform a variety of operations, including the operations of the various embodiments described above. In an embodiment, the processor 151 is a part of one of the internal radios, such as the processor within a cellular network transceiver. Typically, software instructions may be stored in the internal memory 152 before they are accessed and loaded into the processor 151. In some devices, the processor 151 may include internal memory 152 sufficient to store the software instructions. Memory within the processor 151 or internal memory 152 may also be used to store bits or other logical values for tracking operating modes of the device, such as in a control register that may store operating mode bits and/or flags. For the purposes of this description, the term "memory" refers to all memory accessible by the processor 151, including connected memory units 152 and memory within the processor 151 itself. In many devices, the memory 152 may be a volatile or nonvolatile memory, such as flash memory, or a mixture of both.

Figure 8:
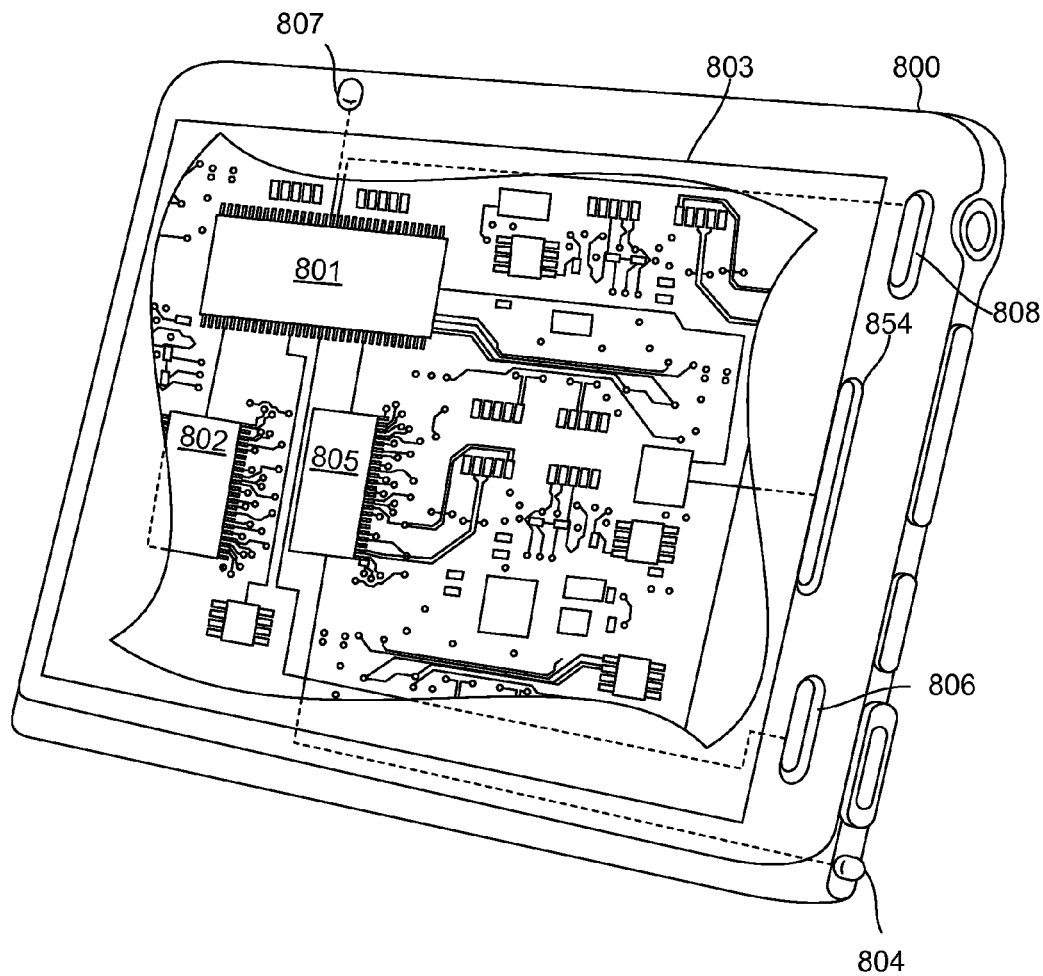
FIG. 8 is a component block diagram of a mobile device, such as a smartphone suitable for use with any of the aspects.

FIG. 8 is a system block diagram of a mobile device, such as a cellular smartphone 19 suitable for use with any of the embodiments described above. A typical mobile device 800 may include a processor 801 coupled to internal memory 802, a display 803, and to a speaker 854. Additionally, the mobile device 800 may include an antenna 804 for sending and receiving electromagnetic radiation that may be connected to a wireless data link, high-power radio, and/or cellular telephone transceiver 805 coupled to the processor 801, a mobile multimedia broadcast receiver 806 coupled to the processor 801 and environmental sensors 807 coupled to the processor 801. Mobile devices 800 typically also include one or more menu selection buttons or rocker switches 808 for receiving user inputs.

Figure 9:
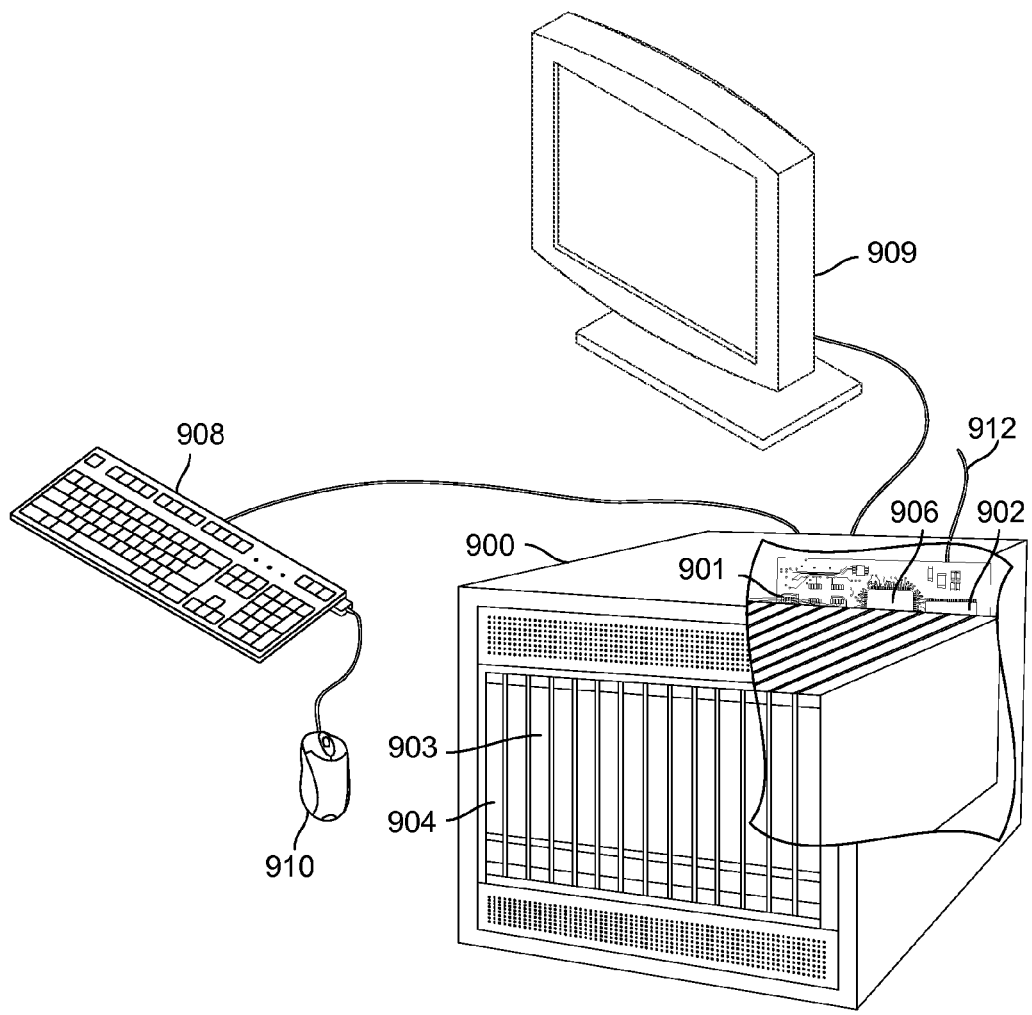
FIG. 9 is a component block diagram of a central server that may be used with the embodiments of the system.

FIG. 9 illustrates an embodiment of a central server that may be used with the embodiments discussed above. A central server 900 typically includes a processor 901 coupled to volatile memory 902 and a large capacity nonvolatile memory, such as a disk drive 903. The server 900 may also include a floppy disc drive, compact disc (CD) or DVD disc drive 904 coupled to the processor 901. The server 900 may also include network access ports 906 coupled to the processor 901 for establishing data connections with a network 912, such as a local area network coupled to other broadcast system computers and servers. Servers 900 may also include operator interfaces, such as a keyboard 908, pointer device (e.g., a computer mouse 910, and a display 909.

Figure 10:
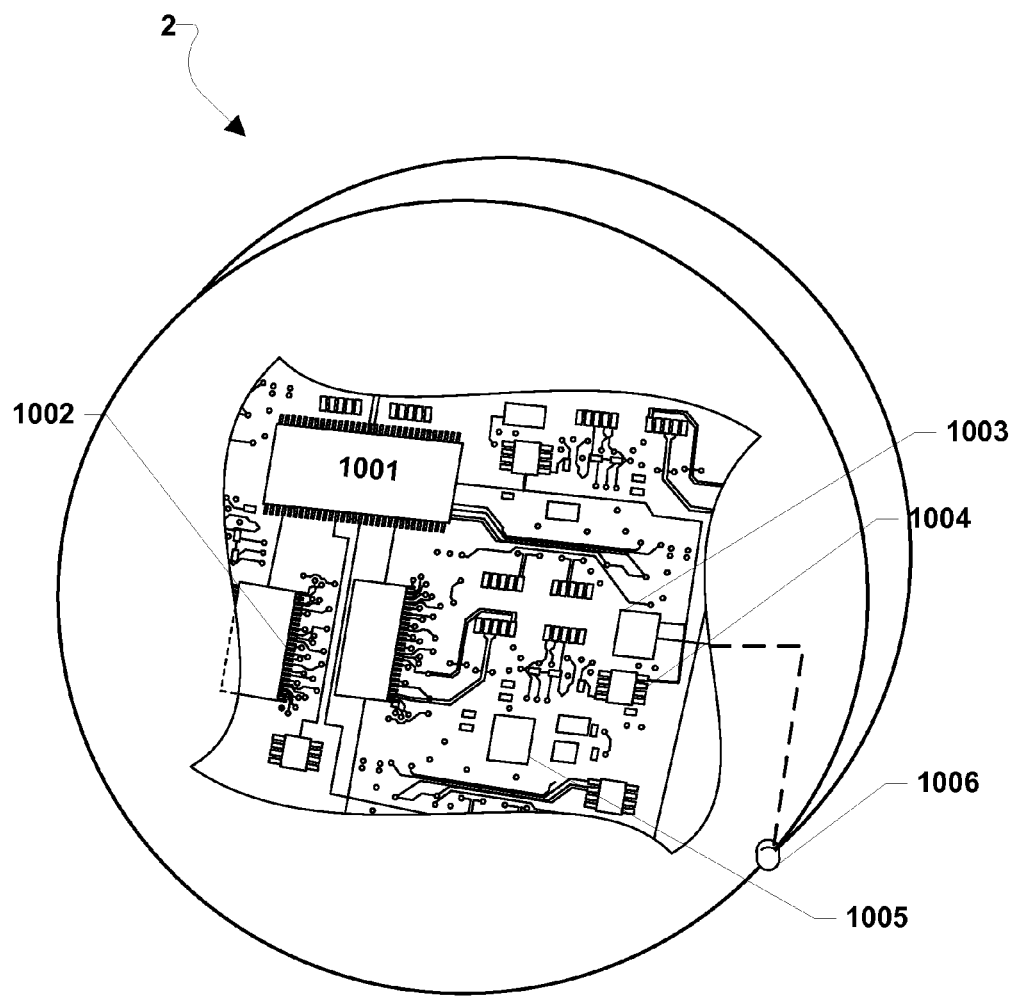
FIG. 10 is a component block diagram of a portable safe-zone beacon suitable for use with any of the aspects.

FIG. 10 is a system block diagram of a portable safe-zone beacon 2 suitable for use with any of the embodiments described above. A typical portable safe-zone beacon 2 may include a processor 1001 coupled to internal memory 1002 and may also include an antenna 1006 for sending and receiving electromagnetic radiation. The antenna 1006 may be connected to a short-range radio 1003 (e.g., Bluetooth LE, RF, etc.) that is also coupled to the processor 1001. In an embodiment, the portable safe-zone beacon may additionally include a second short-range radio 1004 (e.g., Bluetooth, Peanut, Zigbee, Bluetooth LE, ANT/ANT+, etc.) coupled to the processor 1001 and used for exchaning transmissions with other devices utilizing similar radios/protocols (e.g., a Bluetooth-enabled smartphone). Portable safe-zone beacons 2 may include a battery 1005 or other similar power source capable of providing sufficient power for the portable safe-zone beacon 2. In an embodiment, the battery 1005 may be removable and/or rechargeable. In another embodiment but not shown, the portable safe-zone beacon 2 may also include buttons and/or rocker switches for receiving user inputs from a user, visual display units (e.g., LED indicators and/or display screens), units for rendering audio (e.g., a speaker configured to emit sounds based on audio data), and a vibration motor/indicator.

The processors 801, 901, and 1001 may be any programmable microprocessor, microcomputer or multiple processor chip or chips that may be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory 802, 902, and 1002 before they are accessed and loaded into the processors 801, 901, and 1001. The processors 801, 901, and 1001 may include internal memory sufficient to store the application software instructions. In many devices the internal memory may be a volatile or nonvolatile memory, such as flash memory, or a mixture of both. For the purposes of this description, a general reference to memory refers to memory accessible by the processors 801, 901, and 1001 including internal memory or removable memory plugged into the various devices and memory within the processors 801, 901, and 1001.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module, which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of saving power in a tracking device attached to an asset when the asset is intentionally removed from a first safe-zone area, comprising:
   determining whether the tracking device can receive a safe-zone beacon signal with at least a predetermined threshold signal strength;
   determining whether the safe-zone beacon signal is received from a base safe-zone beacon or a portable safe-zone beacon;
   placing the tracking device in a low-power mode in response to receiving the safe-zone beacon signal, wherein the low power mode is either a base low-power mode when it is determined that the safe-zone beacon signal is received from the base safe zone beacon or a portable low power mode when it is determined that the safe-zone beacon signal is received from the portable safe zone beacon;
   configuring the portable low-power mode to cause the tracking device to transmit data to and receive data from the portable safe-zone beacon;
   transmitting tracking device data to the portable safe-zone beacon when the tracking device is placed in the portable low-power mode, wherein the tracking device data is relayed from the portable safe-zone beacon to a mobile device via an established communication link and further relayed from the mobile device to an external network via a wireless data network; and
   placing the tracking device in an alarm mode in response to the tracking device not receiving the safe-zone beacon signal,
   wherein the alarm mode is configured in response to receiving the safe-zone beacon signal from the portable safe-zone beacon in a manner that is different from how the alarm mode is configured in response to receiving the safe-zone beacon signal from the base safe-zone beacon.

2. The method of claim 1, wherein:
   the alarm mode is configured in response to determining that the safe-zone beacon signal is received from the base safe-zone beacon to begin transmitting alarm messages from the tracking device after a first delay following loss of the safe-zone beacon signal; and
   the alarm mode is configured in response to determining that the safe-zone beacon signal is received from the portable safe-zone beacon to begin transmitting the alarm messages from the tracking device after a second delay following loss of the safe-zone beacon signal, wherein the second delay is different from the first delay.

3. The method of claim 1, wherein:
   the alarm mode is configured in response to determining that the safe-zone beacon signal is received from the base safe-zone beacon to begin transmitting alarm messages containing a first message content following loss of the safe-zone beacon signal; and
   the alarm mode is configured in response to determining that the safe-zone beacon signal is received from the portable safe-zone beacon to begin transmitting the alarm messages containing a second message content following loss of the safe-zone beacon signal, wherein the second message content is different from the first message content.

4. The method of claim 1, wherein:
   the alarm mode is configured in response to determining that the safe-zone beacon signal is received from the base safe-zone beacon to begin transmitting alarm messages to a first address following loss of the safe-zone beacon signal; and
   the alarm mode is configured in response to determining that the safe-zone beacon signal is received from the portable safe-zone beacon to begin transmitting the alarm messages to a second address following loss of the safe-zone beacon signal, wherein the second address is different from the first address.

5. The method of claim 1, wherein determining that the safe-zone beacon signal is received from the base safe-zone beacon or the portable safe-zone beacon comprises:
   analyzing data within a received short-range wireless transmission to determine whether it identifies a source of the transmission as one of the portable safe-zone beacon and the base safe-zone beacon.

6. The method of claim 5, wherein determining that the safe-zone beacon signal is received from the base safe-zone beacon or the portable safe-zone beacon further comprises comparing data within the received short-range wireless transmission to information within a database that defines safe-zones associated with the tracking device.

7. The method of claim 1, wherein:
   the base low-power mode is configured in response to determining that the safe-zone beacon signal is received from the base safe-zone beacon to transmit data from the tracking device at a first rate; and
   the portable low-power mode is configured in response to determining that the safe-zone beacon signal is received from the portable safe-zone beacon to transmit the data from the tracking device at a second rate different from the first rate.

8. The method of claim 7, wherein the data transmitted from the tracking device comprises at least one of sensor data, location coordinates, previous communications information, identification information, configuration information of the tracking device, and battery status.

9. The method of claim 1, further comprising:
   receiving at the tracking device from the portable safe-zone beacon at least one of instructions and configuration settings for the tracking device, wherein the at least one of instructions and configuration settings are received at the mobile device via the wireless data network and relayed from the mobile device to the portable safe-zone beacon via the established communication link; and
   implementing the received at least one of instructions and configuration settings in the tracking device.

10. The method of claim 1, wherein the tracking device data comprises one or more of sensor data, location coordinates, previous communications information, identification information, configuration information of the tracking device, and battery status.

11. A tracking device, comprising:
   means for determining whether the tracking device can receive a safe-zone beacon signal with at least a predetermined threshold signal strength;
   means for determining whether the safe-zone beacon signal is received from a base safe-zone beacon or a portable safe-zone beacon;
   means for placing the tracking device in a low-power mode in response to receiving the safe-zone beacon signal, wherein the low power mode is either a base low-power mode when it is determined that the safe-zone beacon signal is received from the base safe zone beacon or a portable low power mode when it is determined that the safe-zone beacon signal is received from the portable safe zone beacon;
   means for configuring the portable low-power mode to cause the tracking device to transmit data to and receive data from the portable safe-zone beacon;
   means for transmitting tracking device data to the portable safe-zone beacon when the tracking device is placed in the portable low-power mode, wherein the tracking device data is relayed from the portable safe-zone beacon to a mobile device via an established communication link and further relayed from the mobile device to an external network via a wireless data network; and
   means for placing the tracking device in an alarm mode in response to the tracking device not receiving the safe-zone beacon signal,
   wherein the alarm mode is configured in response to receiving the safe-zone beacon signal from the portable safe-zone beacon in a manner that is different from how the alarm mode is configured in response to receiving the safe-zone beacon signal from the base safe-zone beacon.

12. The tracking device of claim 11, wherein:
   the alarm mode is configured in response to determining that the safe-zone beacon signal is received from the base safe-zone beacon to begin transmitting alarm messages from the tracking device after a first delay following loss of the safe-zone beacon signal; and
   the alarm mode is configured in response to determining that the safe-zone beacon signal is received from the portable safe-zone beacon to begin transmitting the alarm messages from the tracking device after a second delay following loss of the safe-zone beacon signal, wherein the second delay is different from the first delay.

13. The tracking device of claim 11, wherein:
   the alarm mode is configured in response to determining that the safe-zone beacon signal is received from the base safe-zone beacon to begin transmitting alarm messages containing a first message content following loss of the safe-zone beacon signal; and
   the alarm mode is configured in response to determining that the safe-zone beacon signal is received from the portable safe-zone beacon to begin transmitting the alarm messages containing a second message content following loss of the safe-zone beacon signal, wherein the second message content is different from the first message content.

14. The tracking device of claim 11, wherein:
   the alarm mode is configured in response to determining that the safe-zone beacon signal is received from the base safe-zone beacon to begin transmitting alarm messages to a first address following loss of the safe-zone beacon signal; and
   the alarm mode is configured in response to determining that the safe-zone beacon signal is received from the portable safe-zone beacon to begin transmitting the alarm messages to a second address following loss of the safe-zone beacon signal, wherein the second address is different from the first address.

15. The tracking device of claim 11, wherein means for determining that the safe-zone beacon signal is received from the base safe-zone beacon or the portable safe-zone beacon comprises:
   means for analyzing data within a received short-range wireless transmission to determine whether it identifies a source of the transmission as one of the portable safe-zone beacon and the base safe-zone beacon.

16. The tracking device of claim 15, wherein means for determining that the safe-zone beacon signal is received from the base safe-zone beacon or the portable safe-zone beacon further comprises means for comparing data within the received short-range wireless transmission to information within a database that defines safe-zones associated with the tracking device.

17. The tracking device of claim 11, wherein:
   the base low-power mode is configured in response to determining that the safe-zone beacon signal is received from the base safe-zone beacon to transmit data from the tracking device at a first rate; and
   the portable low-power mode is configured in response to determining that the safe-zone beacon signal is received from the portable safe-zone beacon to transmit the data from the tracking device at a second rate different from the first rate.

18. The tracking device of claim 17, wherein the data transmitted from the tracking device comprises at least one of sensor data, location coordinates, previous communications information, identification information, configuration information of the tracking device, and battery status.

19. The tracking device of claim 11, further comprising:
   means for receiving at least one of instructions and configuration settings relayed from the portable safe-zone beacon, wherein the at least one of instructions and configuration settings are received at the mobile device via the wireless data network and relayed from the mobile device to the portable safe-zone beacon via the established communication link; and
   means for implementing the received at least one of instructions and configuration settings in the tracking device.

20. The tracking device of claim 11, wherein the tracking device data comprises one or more of sensor data, location coordinates, previous communications information, identification information, configuration information of the tracking device, and battery status.

21. A tracking device, comprising:
   a memory;
   a processor coupled to the memory, wherein the processor is configured with processor-executable instructions to perform operations comprising:
      determining whether the tracking device can receive a safe-zone beacon signal with at least a predetermined threshold signal strength;
      determining whether the safe-zone beacon signal is received from a base safe-zone beacon or a portable safe-zone beacon;

placing the tracking device in a low-power mode in response to receiving the safe-zone beacon signal, wherein the low power mode is either a base low-power mode when it is determined that the safe-zone beacon signal is received from the base safe zone beacon or a portable low power mode when it is determined that the safe-zone beacon signal is received from the portable safe zone beacon;

configuring the portable low-power mode to cause the tracking device to transmit data to and receive data from the portable safe-zone beacon;

transmitting tracking device data to the portable safe-zone beacon when the tracking device is placed in the portable low-power mode, wherein the tracking device data is relayed from the portable safe-zone beacon to a mobile device via an established communication link and further relayed from the mobile device to an external network via a wireless data network; and placing the tracking device in an alarm mode in response to the tracking device not receiving the safe-zone beacon signal, wherein the alarm mode is configured in response to receiving the safe-zone beacon signal from the portable safe-zone beacon in a manner that is different from how the alarm mode is configured in response to receiving the safe-zone beacon signal from the base safe-zone beacon.

22. The tracking device of claim 21, wherein the processor is configured with processor-executable instructions to perform operations such that:

the alarm mode is configured in response to determining that the safe-zone beacon signal is received from the base safe-zone beacon to begin transmitting alarm messages from the tracking device after a first delay following loss of the safe-zone beacon signal; and the alarm mode is configured in response to determining that the safe-zone beacon signal is received from the portable safe-zone beacon to begin transmitting the alarm messages from the tracking device after a second delay following loss of the safe-zone beacon signal, wherein the second delay is different from the first delay.

23. The tracking device of claim 21, wherein the processor is configured with processor-executable instructions to perform operations such that:

the alarm mode is configured in response to determining that the safe-zone beacon signal is received from the base safe-zone beacon to begin transmitting alarm messages containing a first message content following loss of the safe-zone beacon signal; and the alarm mode is configured in response to determining that the safe-zone beacon signal is received from the portable safe-zone beacon to begin transmitting the alarm messages containing a second message content following loss of the safe-zone beacon signal, wherein the second message content is different from the first message content.

24. The tracking device of claim 21, wherein the processor is configured with processor-executable instructions to perform operations such that:

the alarm mode is configured in response to determining that the safe-zone beacon signal is received from the base safe-zone beacon to begin transmitting alarm messages to a first address following loss of the safe-zone beacon signal; and the alarm mode is configured in response to determining that the safe-zone beacon signal is received from the portable safe-zone beacon to begin transmitting the alarm messages to a second address following loss of the safe-zone beacon signal, wherein the second address is different from the first address.

25. The tracking device of claim 21, wherein the processor is configured with processor-executable instructions to perform operations such that determining that the safe-zone beacon signal is received from the base safe-zone beacon or the portable safe-zone beacon comprises:

analyzing data within a received short-range wireless transmission to determine whether it identifies a source of the transmission as one of the portable safe-zone beacon and the base safe-zone beacon.

26. The tracking device of claim 25, wherein the processor is configured with processor-executable instructions to perform operations such that determining that the safe-zone beacon signal is received from the base safe-zone beacon or the portable safe-zone beacon further comprises comparing data within the received short-range wireless transmission to information within a database that defines safe-zones associated with the tracking device.

27. The tracking device of claim 21, wherein the processor is configured with processor-executable instructions to perform operations such that:

the base low-power mode is configured in response to determining that the safe-zone beacon signal is received from the base safe-zone beacon to transmit data from the tracking device at a first rate; and the portable low-power mode is configured in response to determining that the safe-zone beacon signal is received from the portable safe-zone beacon to transmit the data from the tracking device at a second rate different from the first rate.

28. The tracking device of claim 27, wherein the processor is configured with processor-executable instructions to perform operations such that the data transmitted from the tracking device comprises at least one of sensor data, location coordinates, previous communications information, identification information, configuration information of the tracking device, and battery status.

29. The tracking device of claim 21, wherein the processor is configured with processor-executable instructions to perform operations further comprising:

receiving at the tracking device at least one of instructions and configuration settings relayed from the portable safe-zone beacon, wherein the at least one of instructions and configuration settings are received at the mobile device via the wireless data network and relayed from the mobile device to the portable safe-zone beacon via the established communication link; and implementing the received at least one of instructions and configuration settings in the tracking device.

30. The tracking device of claim 21, wherein the processor is configured with processor-executable instructions to perform operations such that the tracking device data comprises one or more of sensor data, location coordinates, previous communications information, identification information, configuration information of the tracking device, and battery status.

31. A non-transitory processor-readable storage medium having stored thereon processor-executable software instructions configured to cause a processor of a tracking device to perform operations comprising:

determining whether the tracking device can receive a safe-zone beacon signal with at least a predetermined threshold signal strength;

determining whether the safe-zone beacon signal is received from a base safe-zone beacon or a portable safe-zone beacon;

placing the tracking device in a low-power mode in response to receiving the safe-zone beacon signal, wherein the low power mode is either a base low-power mode when it is determined that the safe-zone beacon signal is received from the base safe zone beacon or a portable low power mode when it is determined that the safe-zone beacon signal is received from the portable safe zone beacon;

configuring the portable low-power mode to cause the tracking device to transmit data to and receive data from the portable safe-zone beacon;

transmitting tracking device data to the portable safe-zone beacon when the tracking device is placed in the portable low-power mode, wherein the tracking device data is relayed from the portable safe-zone beacon to a mobile device via an established communication link and further relayed from the mobile device to an external network via a wireless data network; and placing the tracking device in an alarm mode in response to the tracking device not receiving the safe-zone beacon signal, wherein the alarm mode is configured in response to receiving the safe-zone beacon signal from the portable safe-zone beacon in a manner that is different from how the alarm mode is configured in response to receiving the safe-zone beacon signal from the base safe-zone beacon.

32. The non-transitory processor-readable storage medium of claim 31, wherein the stored processor-executable software instructions are configured to cause the processor to perform operations such that:

the alarm mode is configured in response to determining that the safe-zone beacon signal is received from the base safe-zone beacon to begin transmitting alarm messages from the tracking device after a first delay following loss of the safe-zone beacon signal; and the alarm mode is configured in response to determining that the safe-zone beacon signal is received from the portable safe-zone beacon to begin transmitting the alarm messages from the tracking device after a second delay following loss of the safe-zone beacon signal, wherein the second delay is different from the first delay.

33. The non-transitory processor-readable storage medium of claim 31, wherein the stored processor-executable software instructions are configured to cause the processor to perform operations such that:

the alarm mode is configured in response to determining that the safe-zone beacon signal is received from the base safe-zone beacon to begin transmitting alarm messages containing a first message content following loss of the safe-zone beacon signal; and the alarm mode is configured in response to determining that the safe-zone beacon signal is received from the portable safe-zone beacon to begin transmitting the alarm messages containing a second message content following loss of the safe-zone beacon signal, wherein the second message content is different from the first message content.

34. The non-transitory processor-readable storage medium of claim 31, wherein the stored processor-executable software instructions are configured to cause the processor to perform operations such that:

the alarm mode is configured in response to determining that the safe-zone beacon signal is received from the base safe-zone beacon to begin transmitting alarm messages to a first address following loss of the safe-zone beacon signal; and the alarm mode is configured in response to determining that the safe-zone beacon signal is received from the portable safe-zone beacon to begin transmitting the alarm messages to a second address following loss of the safe-zone beacon signal, wherein the second address is different from the first address.

35. The non-transitory processor-readable storage medium of claim 31, wherein the stored processor-executable software instructions are configured to cause the processor to perform operations such that determining that the safe-zone beacon signal is received from the base safe-zone beacon or the portable safe-zone beacon comprises:

analyzing data within a received short-range wireless transmission to determine whether it identifies a source of the transmission as one of the portable safe-zone beacon and the base safe-zone beacon.

36. The non-transitory processor-readable storage medium of claim 35, wherein the stored processor-executable software instructions are configured to cause the processor to perform operations such that determining that the safe-zone beacon signal is received from the base safe-zone beacon or the portable safe-zone beacon further comprises comparing data within the received short-range wireless transmission to information within a database that defines safe-zones associated with the tracking device.

37. The non-transitory processor-readable storage medium of claim 31, wherein the stored processor-executable software instructions are configured to cause the processor to perform operations such that:

the base low-power mode is configured in response to determining that the safe-zone beacon signal is received from the base safe-zone beacon to transmit data from the tracking device at a first rate; and the portable low-power mode is configured in response to determining that the safe-zone beacon signal is received from the portable safe-zone beacon to transmit the data from the tracking device at a second rate different from the first rate.

38. The non-transitory processor-readable storage medium of claim 37, wherein the stored processor-executable software instructions are configured to cause the processor to perform operations such that the data transmitted from the tracking device comprises at least one of sensor data, location coordinates, previous communications information, identification information, configuration information of the tracking device, and battery status.

39. The non-transitory processor-readable storage medium of claim 21, wherein the stored processor-executable software instructions are configured to cause the processor to perform operations further comprising:

receiving at the tracking device at least one of instructions and configuration settings relayed from the portable safe-zone beacon, wherein the at least one of instructions and configuration settings are received at the mobile device via the wireless data network and relayed from the mobile device to the portable safe-zone beacon via the established communication link; and implementing the received at least one of instructions and configuration settings in the tracking device.

40. The non-transitory processor-readable storage medium of claim 31, wherein the stored processor-executable software instructions are configured to cause the processor to perform operations such that the tracking device data comprises one or more of sensor data, location coordinates, previous communications information, identification information, configuration information of the tracking device, and battery status.

41. A system, comprising:
   a tracking device;
   a base safe-zone beacon configured to emit a first beacon signal; and
   a portable safe-zone beacon configured to emit a second beacon signal,
   wherein the tracking device comprises:
      a first transceiver configured to communicate with a network via long-range signals;
      a second transceiver configured to receive the first and second beacon signals and to communicate with the portable safe-zone beacon and the base safe-zone beacon via short-range signals; and
      a first processor coupled to the first and second transceivers, and configured with processor-executable instructions to perform operations comprising:
         determining whether the second transceiver can receive a beacon signal with at least a predetermined threshold signal strength;
         determining whether the beacon signal received by the second transceiver is the first beacon signal or the second beacon signal;
         placing the tracking device in a base low-power mode in response to receiving the first beacon signal or a portable low power mode in response to receiving the second beacon signal, wherein the portable low-power mode is configured in a manner that is different from how the base low-power mode is configured;
         configuring the portable low-power mode to cause the tracking device to transmit data to and receive data from the portable safe-zone beacon;
         transmitting, via the second transceiver, tracking device data to the portable safe-zone beacon in the portable low-power mode wherein the tracking device data is relayed from the portable safe-zone beacon to a mobile device via an established communication link and further relayed from the mobile device to an external network via a wireless data network; and
         activating an alarm mode in response to the tracking device not receiving either the first or second beacon signals, wherein the alarm mode activated depends upon whether a last beacon signal received was the first beacon signal or the second beacon signal.

* * * * *